US010002152B2

(12) United States Patent
Spalka et al.

(10) Patent No.: US 10,002,152 B2
(45) Date of Patent: *Jun. 19, 2018

(54) CLIENT COMPUTER FOR UPDATING A DATABASE STORED ON A SERVER VIA A NETWORK

(71) Applicant: COMPUGROUP MEDICAL SE, Koblenz (DE)

(72) Inventors: Adrian Spalka, Koblenz (DE); Jan Lehnhardt, Koblenz (DE)

(73) Assignee: COMPUGROUP MEDICAL SE, Koblenz (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/286,638

(22) Filed: Oct. 6, 2016

(65) Prior Publication Data
US 2017/0024425 A1 Jan. 26, 2017

Related U.S. Application Data

(62) Division of application No. 14/495,980, filed on Sep. 25, 2014, now Pat. No. 9,495,555.

(30) Foreign Application Priority Data

Sep. 27, 2013 (EP) .................................... 13186330

(51) Int. Cl.
*G06F 21/62* (2013.01)
*G06F 17/30* (2006.01)
(Continued)

(52) U.S. Cl.
CPC .. *G06F 17/30365* (2013.01); *G06F 17/30283* (2013.01); *G06F 17/30345* (2013.01);
(Continued)

(58) Field of Classification Search
CPC .......... G06F 17/30365; G06F 21/6245; G06F 17/30283; G06F 21/602; G06F 21/34;
(Continued)

(56) References Cited

U.S. PATENT DOCUMENTS 5,994,780 A 8/1999 Chase et al.
6,785,810 B1 8/2004 Lirov et al.
(Continued)

FOREIGN PATENT DOCUMENTS

EP 2731044 A1 5/2014
WO 99/38080 A1 7/1999
WO 03/021484 A2 3/2003

OTHER PUBLICATIONS

European Search Report dated Nov. 6, 2015 for corresponding EP Application No. EP 13186330, 16 pages.
(Continued)

*Primary Examiner* — Meng Li

(57) ABSTRACT

The invention relates to a client computer for updating a database stored on a server via a network, the server being coupled to the client computer via the network, wherein the database comprises a set of first relations, wherein each first relation in the set of the first relations comprises first data items, wherein for each first relation the first data items are encrypted with a respective first cryptographic key in the first relation, wherein the first data items form a partially ordered set in each first relation, in each first relation the partial order being formed with respect to the first data items of said first relation in non-encrypted form.

5 Claims, 14 Drawing Sheets

(51) Int. Cl.
*H04L 9/32* (2006.01)
*H04L 9/14* (2006.01)
*G06F 21/34* (2013.01)
*H04L 29/06* (2006.01)
*G06F 21/60* (2013.01)

(52) U.S. Cl.
CPC .. *G06F 17/30389* (2013.01); *G06F 17/30864* (2013.01); *G06F 21/34* (2013.01); *G06F 21/602* (2013.01); *G06F 21/6218* (2013.01); *G06F 21/6227* (2013.01); *G06F 21/6245* (2013.01); *H04L 9/14* (2013.01); *H04L 9/3247* (2013.01); *H04L 63/0435* (2013.01); *H04L 63/0442* (2013.01); *H04L 63/0471* (2013.01); *H04L 63/083* (2013.01); *F04C 2270/0421* (2013.01); *G06F 2221/2107* (2013.01); *G06F 2221/2115* (2013.01)

(58) Field of Classification Search
CPC ......... G06F 17/30864; G06F 17/30345; G06F 17/30389; G06F 21/6227; G06F 21/6218; G06F 2221/2115; G06F 2221/2107; H04L 63/0471; H04L 63/083; H04L 63/0435; H04L 63/0442; H04L 9/3247; H04L 9/14; F04C 2270/0421
See application file for complete search history.

(56) References Cited

U.S. PATENT DOCUMENTS

| | | | |
|---|---|---|---|
| 7,058,622 | B1 | 6/2006 | Tedesco |
| 8,909,677 | B1 | 12/2014 | Aguilera et al. |
| 9,558,228 | B2 | 1/2017 | Spalka et al. |
| 2002/0174355 | A1 | 11/2002 | Rajasekaran et al. |
| 2002/0193066 | A1* | 12/2002 | Connelly ............... E04D 13/176 454/365 |
| 2006/0236104 | A1 | 10/2006 | Wong et al. |
| 2007/0118731 | A1 | 5/2007 | Zizzi |
| 2008/0080718 | A1 | 4/2008 | Meijer et al. |
| 2008/0097954 | A1* | 4/2008 | Dutta ................ G06F 17/30483 |
| 2008/0270370 | A1 | 10/2008 | Catellanos et al. |
| 2009/0210414 | A1 | 8/2009 | Shinjo |
| 2010/0266132 | A1 | 10/2010 | Bablani et al. |
| 2010/0306221 | A1* | 12/2010 | Lokam ............... G06F 17/30631 707/759 |
| 2011/0129089 | A1 | 6/2011 | Kim et al. |
| 2016/0070740 | A1 | 3/2016 | Vermeulen et al. |
| 2016/0371503 | A1 | 12/2016 | Spalka et al. |
| 2017/0041298 | A1 | 2/2017 | Lehnhardt et al. |

OTHER PUBLICATIONS

Al-Sakran, H.O. et al., "Efficient Cryptographic Technique for Securing and Accessing Outsourced Data," (IJCSIS) International Journal of Computer Science and Information Security,vol. 9, No. 8, Aug. 2011, Management Information Systems Department King Saud University Riyadh, Saudi Arabia; 6 pages.
Song, D. et al.,"Practical Techniques for Searches on Encrypted Data", in Proc. of the 2000 IEEE Symposium on Security and Privacy (S&P 2000), 2000, 12 pages.
Restriction Requirement dated Feb. 5, 2016 for U.S. Appl. No. 14/495,980, 7 pgs.
Non-Final Office Action dated Apr. 14, 2016 for U.S. Appl. No. 14/495,980, 10 pgs.
Notice of Allowance dated Jul. 15, 2016 for U.S. Appl. No. 14/495,980, 10 pgs.
Office Action dated Jun. 6, 2017 for EP Application No. 13186330, 8 pages.
Knuth, Donald E., "The Art of Computer Programming, vol. 3: Sorting and Searching, Second Edition;" May 24, 1998; Addison-Wesley Professional; XP55232565, 8 pages.
Knuth, Donald E., "Sorting and Searching—The Art of Computer Programming;" Jan. 1, 1998; Addison-Wesley; XP002053794; pp. 406-419.
De Couto, Douglas, "One Dimensional Binary Searching," Mar. 17, 1998; XP055375942; retrieved from <<http://groups.csail.mit.edu/graphics/classes/6.838/S98/meetings/m13/1d-bst.html>> on May 24, 2017; 4 pages.
European Search Report dated Nov. 9, 2015 for EP Application No. EP 13186333, 16 pages.
Office Action dated Jun. 6, 2017 for EP Application No. EP 13186333, 8 pages.
Non-Final Office Action dated May 11, 2016 for U.S. Appl. No. 14/495,981, 29 pages.
Notice of Allowance dated Sep. 29, 2016 for U.S. Appl. No. 14/495,981, 17 pages.
Non-Final Office Action dated Sep. 28, 2017 for U.S. Appl. No. 15/202,672, 14 pages.
European Search Report dated May 15, 2017 for EP Application No. EP 16204660.1, 10 pages.
Final Office Action dated Jan. 29, 2018 for U.S. Appl. No. 15/202,672, 13 pages.

* cited by examiner

CLIENT COMPUTER FOR UPDATING A DATABASE STORED ON A SERVER VIA A NETWORK

CROSS-REFERENCE TO RELATED APPLICATION(S)

The present application is a divisional of U.S. patent application Ser. No. 14/495,980, entitled "CLIENT COMPUTER FOR QUERYING A DATABASE STORED ON A SERVER VIA A NETWORK" filed on Sep. 25, 2014, which claims priority to European Patent Application No. EP 13 186 330.0, entitled "CLIENT COMPUTER FOR QUERYING A DATABASE STORED ON A SERVER VIA A NETWORK," filed on Sep. 27, 2013, the entirety of which are herein incorporated by reference. The present application is related to co-pending U.S. patent application Ser. No. 15/202,672, entitled "CLIENT COMPUTER FOR UPDATING A DATABASE STORED ON A SERVER VIA A NETWORK," filed on Jul. 6, 2016, which is a divisional of U.S. patent application Ser. No. 14/495,981, filed on Sep. 25, 2014, now issued as U.S. Pat. No. 9,558,228.

The invention relates to a client computer for querying a database stored on a server via a network, a computer system comprising a client computer, a method of querying by a client computer a database stored on a server, a client computer for updating a first relation comprised in a database stored on a server, a method of updating by a client computer a first relation comprised in a database stored on a server and a computer program product.

Storage and retrieval of encrypted data items for which confidentiality needs to be preserved on a server computer is as such known from the prior art, such as from D. Song, D. Wagner and A. Perrig, "Practical Techniques for Searches on Encrypted Data", in Proc. of the 2000 IEEE Symposium on Security and Privacy (S&P 2000), 2000. And (IJCSIS) International Journal of Computer Science and Information Security, Vol. 9, No. 8, August 2011, Efficient Cryptographic Technique for Securing and Accessing Outsourced Data, Hasan Omar Al-Sakran, Fahad Bin, Muhayalrina Serguievskaia, Management Information Systems Department King Saud University Riyadh, Saudi Arabia.

It is an object of the present invention to provide an improved client computer for querying a database stored on a server via a network, computer system comprising a client computer, method of querying by a client computer a database stored on a server, client computer for updating a first relation comprised in a database stored on a server, method of updating by a client computer a first relation comprised in a database stored on a server and an improved computer program product.

The underlying problem of the invention is solved by the features laid down in the independent claims. Embodiments of the invention are given in the dependent claims.

Embodiments of the invention provide for a client computer for querying a database stored on a server via a network, the server being coupled to the client computer via the network, wherein the database comprises a set of first relations, wherein each first relation in the set of the first relations comprises first data items, wherein for each first relation the first data items are encrypted with a respective first cryptographic key in the first relation. Either the first data items of all first relations are encrypted with the same first cryptographic key or each first relation has assigned an individual first cryptographic key. Further, any mixture of these embodiments is possible like using an individual first cryptographic key only for some of the first relations, while others of the first relations share a common first cryptographic key. The first data items form a partially ordered set in each first relation, in each first relation the partial order being formed with respect to the first data items of said first relation in non-encrypted form, wherein the client computer has installed thereon an application program, the application program being operational for:

a) receiving a search request, said search request specifying a search interval, a number of maximum total hits and a search direction, b) declaring the infimum as the interval boundary in case the search direction is ascending with respect to the order in which the encrypted first data items are stored in said first relations or declaring the supremum as the interval boundary in case the search direction is descending with respect to the order in which the encrypted first data items are stored in said first relations, c) determining for each first relation the encrypted first data item forming the interval boundary, wherein the determining of the encrypted first data item forming the interval boundary is performed by requesting for each first relation encrypted current first data items, receiving and decrypting said requested encrypted current first data items and determining, using the partial order of the first relation, if one data item of the decrypted current first data items forms the interval boundary, d) in case the interval boundary cannot be determined from the decrypted current first data item, repeating step c), wherein said determining results in a set of current decrypted first data items comprising one of the current decrypted first data items for each first relation forming the interval boundary, e) selecting as a current hit data item the decrypted current first data item from the set of current decrypted first data items which forms the interval boundary with respect to the set of current decrypted first data items and which is lying in the interval, and removing the current hit data item from the set of current decrypted first data items, f) in case the total number of selected current hit data items is below the number of maximum total hits, providing a request for a new encrypted first data item, wherein the request for the new encrypted first data item comprises information that the new encrypted first data item is to be retrieved from the first relation comprising the current encrypted first data item corresponding to the current hit data item at a position in the partial order immediately preceding or succeeding the position of the current encrypted first data item corresponding to the current hit data item, depending if the interval boundary is the supremum or the infimum, and in response to said provision of the request for the new encrypted first data item, receiving the new encrypted first data item, decrypting the new encrypted first data item for obtaining a new decrypted first data item as the current decrypted first data item and adding said current decrypted first data item to the set of current decrypted first data items, g) repeating steps e)-f) while the total number of selected current hit data items is below the number of maximum total hits and the current hit data item is satisfying the interval.

Embodiments of the invention may have the advantage that a search for data items stored distributed over multiple first relations is possible, even though the search specifies a search interval and even though the data items are stored encrypted in the multiple relations. The retrieval of the first data items from the database can be performed without any knowledge of the respective cryptographic key by the database. At no time, the database has to be aware of any of the first cryptographic keys or the plain text content of the first data items. Thus, there is no risk of compromising the first data items at the database. Nevertheless, standard database techniques can be used for querying the database including usage of database indexes. Therefore, the search and retrieval of first data items is quick. Further, the amount of data to be transmitted between the client computer and the database is limited to a minimum. For example, only standard queries and retrieved first data items may be transmitted between the client computer and the database. This may predestine the employment of the described computer system in a cloud computing environment with the database being part of the cloud.

Further, any communication between the client computer and the database is secure since it is encrypted by the first cryptographic key or the first cryptographic keys in case of using an individual first key per first relation.

A further advantage may be that the obtained current hit data items are readily obtained in the correctly sorted order. Thus, any additional sorting algorithms on the side of the client computer may not be necessary any more. This also permits to speed up the process of data retrieval.

In the above described procedure, in step a) the search request is received. In step b), either the infimum or the supremum is declared as the interval boundary, depending on the search direction. In the context of the present description, the infimum of an interval I of a partially ordered set T is the element of T which forms the greatest lower bound of I. Contrary, the supremum of an interval I of a partially ordered set T is the element of T which forms the lowest upper bound of I.

Subsequent steps c) and d) serve the purpose to determine for each first relation the data item which forms in said respective relation the interval boundary. This results in the set of current decrypted first data items. In step e), the element of the set of current decrypted first data items that forms the interval boundary in said set is selected as a current hit data item. As a consequence, step f) comprises a check for another first data item in the relation which comprises the current hit data item in encrypted form. The reason is that the set of current decrypted first data items always comprises preferably only one data item for each first relation. Since the current hit data item is now selected as a hit data item, the client has to check if said first relation which comprises the current hit data item in encrypted form comprises another data item which may form another hit data item. Otherwise for determining any further hit data items said first relation would not be considered any more.

It has to be noted here that the above described method does not exclude the possibility that more than one data item per first relation is comprised in the set of current decrypted first data items.

In the context of the present disclosure, a partially ordered set is understood as any set of data elements that formalizes the concept of an ordering, sequencing, or arrangement of the elements of a set. A partially ordered set consists of a set together with a binary relation that indicates that, for certain pairs of elements in the set, one of the elements precedes the other. Such a relation is called a partial order to reflect the fact that not every pair of elements need be related: for some pairs, it may be that neither element precedes the other in the partial ordered set.

In accordance with an embodiment of the invention, the application program is operational for adding in step f) the current decrypted first data item to the set of current decrypted first data items only in case the current decrypted first data item is lying within the interval. This may avoid an additional analysis if a determined current hit data item is satisfying the interval boundaries.

In accordance with an embodiment of the invention, the application program is operational for
  receiving the search request from a requestor,
    providing information content associated with all the selected current hit data items to the requestor,
  wherein
    the information content is given by the decrypted first data items, or
    the database further comprises at least one second relation, wherein the second relation comprises second data items, wherein the second data items are encrypted with at least one second cryptographic key, wherein a referential connection exists assigning each encrypted first data item to at least one of the second data items stored encrypted in the second relation, wherein the information content is comprised in the second data items, wherein the application program is operable to request from the server the information content via the referential connections of the selected current hit data items,
wherein the application program is further operational for decrypting the received encrypted second data items.

This may permit to accelerate the search for the data items forming the interval boundaries since in case of the second option no voluminous data has to be searched. The first data items can remain 'slim' by releasing the information content to the second data items.

It has to be noted that in the context of relational databases, a referential connection is a referential constraint between two tables. For example, a referential connection is a field in a relational table that matches a candidate key of another table. The referential connection can be used to cross-reference the tables. However, the disclosure is not limited to relational databases. Thus, embodiments may for example use directly the information content as given by the decrypted data of the first data item. Alternatively or additionally, each first data item may 'point' to another second data item which comprises in encrypted form the information content. In the latter case, an advantage may be that the first data items may be kept limited to a rather small size since they only describe just as much as necessary in order to allow the identification of the first data items satisfying the interval boundaries. Any further data associated with the first data items may be stored in the second data items.

In accordance with an embodiment of the invention, the first cryptographic key is a symmetric or an asymmetric key and/or the second cryptographic key is a symmetric or an asymmetric key. The first and the second cryptographic key may be identical.

In accordance with an embodiment of the invention the data items are tuples or attribute values of an attribute. The above-described procedure can thus be applied either for tuples as a whole, or parts of tuples or to individual attribute values. It has to be noted here, that the description is not limited to single values of an attribute. An attribute may also comprise multiple elements like for example multiple numbers separated from each other by for example, commas, semicolons or even multiple Boolean operators.

Generally, a data item as understood herein is any data value of a data element of a set of elements like for example a tuple that comprises one or more data elements, such as a data value of a data field of a data record that has multiple data fields, within a database, such as a relational data-base, object oriented databases, object relational databases, hierarchical databases, noSQL databases, or in-memory database. For example, a medical data record of a patient may comprise various data elements, e.g. data fields, such as name, address, telephone number and medical data fields of that patient where data values for name, address and telephone number are exemplary data items.

In accordance with an embodiment of the invention, the application program is further operable to provide the request for the encrypted first data item to the server, wherein the request for the encrypted first data item comprises information that the encrypted first data item is to be retrieved by the server, and in response to said provision of the request for the encrypted first data item, receiving the encrypted first data item from the server. This ensures that for each new data item requested and required by the client the database is asked for a provision of said new data item. As a consequence, data items received by the client will most probably be actual versions of said data items.

In an alternative, in a further embodiment of the invention for each first relation in the set of the first relations the application program is further operable to:
  determine if a requested encrypted first data item is available in a memory assigned to the client,
  in case said requested encrypted first data item is available in the memory, direct the request to said encrypted first data item to the memory and in response receiving said requested encrypted first data item from the memory,
  in case said requested encrypted first data item is unavailable in the memory, direct the request to said encrypted first data item to the server, and in response receive a set of encrypted first data items from the server, said set of encrypted first data items comprising the requested encrypted first data item, wherein the encrypted first data items are ordered in the set of encrypted first data items according to the partial order, and store the set of encrypted first data items in the memory.

This may have the advantage that a part of the first data items is buffered or cached in the memory assigned to the client. The memory may be for example a hard disk of the client, a NAS (network attached storage) or a RAM memory of the client. This reduces the number of requests from the client to the database. Instead of only providing individual encrypted first data items of a first relation to the client, the database may provide a set of multiple first data items which preferable are provided in contiguous form as given by the partial order in said first relation. For example, 10 data items are provided once for performing step c) for a given first relation. Thus, in order to determine the element forming the interval boundary in said first relation, the client may use multiple times elements comprised in the received set of multiple first data items without there in between contacting the data-base.

This may be advantageous in systems with high latency times. For example the client may be communicating with the database via a mobile telecommunication network. Such a network typically has a high data transmission speed but a rather slow response time (high latency time). Instead of having to wait for each request for a respective response from the database, the database may be contacted less frequently and it may instead provide more than a single data item as response. Multiple subsequent accesses to a memory assigned to the client will take less time than individually contacting the database multiple times.

For example, the request to said encrypted first data item directed to the server comprises the number of first data items to be provided in response by the server in the set of first data items, wherein the application program is further operable to determine the number of first data items in the set of first data items by analyzing a performance of the network. The performance of the network may comprise the actual maximum achievable data throughput between the client and the database and/or a network latency when communicating between the database and the client.

In accordance with an embodiment of the invention, in each first relation the first data items form a partial ordered set in said first relation via a rooted tree, wherein the application program is operable to request in step c) when performing step c) for the first time as the current encrypted first data item from the server the first data item stored at the root of said tree. Preferably the tree is automatically balanced by the database such that the speed for determining the interval boundaries is maximized.

In accordance with an embodiment of the invention, the search request comprises a request for a prefix search using a search criterion, wherein the application program is operable to determine the search interval by transforming the prefix search into a corresponding interval comprising the search criterion as an interval boundary. For example, the first data items may form a lexicographically ordered set of data items. In this case, the search criterion may comprise one or more characters followed by a wildcard like '*'. Thus, the left interval boundary is given by the one or more characters and the right interval boundary is given by said one or more characters incremented lexicographically by one character. For example 'ABC*' leads to the interval [ABC, ABD):={x∈Σ*|ABC≤x<ABD}, wherein Σ denotes all elements of the lexicographic alphabet.

In accordance with an embodiment of the invention, for performing steps c) and d), for each decrypted current first data item the application program is further operable for:
  h) determining if the current decrypted first data item lies within the search interval,
  i) in case the current decrypted first data item lies outside the search interval, providing a request for a new encrypted first data item, wherein the request for the new encrypted first data item comprises information that the new encrypted first data item is to be retrieved from a position in the partial order preceding or succeeding the position of the current encrypted first data item, depending if the interval boundary is preceding or succeeding the current decrypted first data item with respect to the partial order, and in response to said provision of the request for the new encrypted first data item, receiving and decrypting the new encrypted first data item,
  j) repeating steps h)-i) with the new decrypted first data item being the current decrypted first data item in step h), until the current decrypted first data item lies within the search interval,
  k) in case the current decrypted first data item lies within the search interval, providing a request for a new encrypted first data item, wherein the request for the new encrypted first data item comprises information that the new encrypted first data item is to be retrieved from a position in the partial order preceding or succeeding the position of the current encrypted first data item, depending if the interval boundary is preceding or succeeding the current decrypted first data item with respect to the partial order, and in response to said provision of the request for the new encrypted first data item, receiving the new encrypted first data item, l) decrypting the new encrypted first data item for obtaining a new decrypted first data item, m) determining if the new decrypted first data item lies outside the search interval, wherein in case the new decrypted first data item lies outside the search interval, selecting the current decrypted first data item as the interval boundary of the search interval, n) in case the new decrypted first data item lies within the search interval, repeating steps k)-m) with the new encrypted first data item being the current encrypted first data item in step k).

This also ensures that for determining of the interval boundaries the database is never provided any intelligible information which at the database would allow a conclusion for the content of the first data items. Thus, high cryptographic security of the first data items can be guaranteed.

The above mentioned steps h)-j) are performed in order to identify if any of the first data items is lying within the interval boundaries. If this is the case, the subsequent steps k)-n) allow identifying the first data item which forms the interval boundary of said interval in the respective first relation. Preferably, in case in step k) the new encrypted first data item is unavailable, the application program is operable to select the current decrypted first data item as the interval boundary of the search interval.

In another aspect, the invention relates to a computer system comprising a client computer as described above, and a database stored on a server, the server being coupled to the client computer via the network, wherein the database comprises a set of first relations, wherein each first relation in the set of the first relations comprises first data items, wherein for each first relation the first data items are encrypted with a respective first cryptographic key in the first relation, wherein the first data items form a partially ordered set in each first relation, in each first relation the partial order being formed with respect to the first data items of said first relation in non-encrypted form.

In accordance with another embodiment of the invention, the database is a relational data-base.

In accordance with an embodiment of the invention, the client computer is a client computer of a set of multiple sets of client computers, each client computer having installed thereon the application program, the application program comprising client computer specific log-in information, wherein the system further comprises:

a database system, the database system comprising the database, the database system having a log-in component for logging-in the client computers, the database system being partitioned into multiple relational databases, each one of the databases being assigned to one set of the sets of client computers, each database storing encrypted data items, wherein the first data items are comprised in said data items, each data item being encrypted with a user or user-group specific cryptographic key, wherein the first cryptographic key corresponds to said user or user-group specific cryptographic key. the key identifier of the cryptographic key with which one of the data items is encrypted being stored in the database as an attribute of the one of the encrypted data items, the log-in component comprising assignment information indicative of the assignment of the databases to the set of client computers, each one of the application programs being operational to perform the steps of:

a) establishing a network session with the database system over the network, b) transmitting the client computer specific log-in information to the database system via the session, c) receiving the key and the key identifier by the client computer for use of the key by the client computer and without transmitting the key to the database system;

d) entry of a search criterion into the client computer, e) generating a database query using the search criterion and the key identifier, the key identifier limiting the query to encrypted data items that have an attribute matching the key identifier, f) in response to the query, receiving at least one encrypted data item matching the search criterion from the database system, g) decrypting the encrypted data item using the cryptographic key, the database system being operational to perform the steps of:

i) receiving the client computer specific log-in information via the session by the log-in component of the database system, ii) determining one of the databases of the database system that is assigned to the client computer on which the application program is installed using the assignment information, by the log-in component of the database system, iii) entering the query received from the application program via the session into the database that has been determined using the log-in information for processing the query by that data-base.

Thus, embodiments of the invention may further provide for a computer system that has multiple sets of client computers. Each set of client computers may belong to a separate organizational entity, such as a separate health service provider, and be located in a separate access restricted environment, such as a medical practice or hospital. Access restriction to the environment can be implemented by physical, such as edificial, and/or organizational measures and/or by an electronic access control system. For example, the entrance door of a medical practice has an electronic lock that can be unlocked by presenting a security token of an authorized user that belongs to the medical practice, such as one of the health professionals or an assistant. During the opening hours of the medical practice access control can be performed by the receptionist of the medical practice.

It is important to note that the access restricted environment in which a set of client computers is located is a trusted environment in which confidentiality of data items, such as patients' medical records, is preserved.

In accordance with embodiments of the invention some or all of the client computers are located outside an access protected enclosed trusted environment. For example, at least some of the client computers are portable electronic telecommunication devices, such as mobile radios or digital cellular mobile telephones, such as smartphones or tablet computers that have a telecommunication interface, such as a GSM, UMTS, WLAN or other network interface.

This is particularly beneficial for applications that involve terrestrial users in vehicles or on foot, such as for emergency responder organizations or public works organizations. In the field of the provision of healthcare services this is particularly beneficial as it enables the use of a mobile portable battery powered client device in the context of emergency medical services and/or home visits of patients by medical doctors.

The cryptographic key and key identifier that is stored in one of the security tokens is specific to the authorized user such that a data item that is inserted into the database upon a respective entry of the data item by that user is encrypted with that user's cryptographic key and can only be retrieved and decrypted by the same user as the user needs to present the security token for the retrieval and decryption operation. Alternatively the user has to memorize the cryptographic key and its key identifier for entry into the respective client computer. As a further alternative the user has to memorize a credential, such as a username/password combination, for entry into the client computer. When the client computer receives the credential from the user it derives the cryptographic key assigned to the user and the respective key identifier using a predefined deterministic algorithm. For example, a predefined function can be utilized for deriving a symmetric key from the user credential. For deriving an asymmetric key pair a method disclosed in U.S. Pat. No. 8,266,435 B2 which is incorporated herein in its entirety can be utilized whereby the credential from which the asymmetric key pair is derived comprises a unique user ID and an arbitrarily selectable user ID.

A "cryptographic key" as understood herein encompasses a symmetric key that serves both for encryption and decryption as well as an asymmetric cryptographic key pair, where the public key is used for encryption and the private key is used for decryption.

A "key identifier" as understood herein encompasses an identifier of a symmetric key or an identifier that identifies an asymmetric cryptographic key pair.

Alternatively the cryptographic keys and key identifiers stored on the security tokens are not user but user-group specific. For example all authorized users of the same set of client computers, i.e. users belonging to the same organizational entity, share a common cryptographic key and key identifier that is specific to that user-group. As a further alternative user-groups within a given organizational entity that share the same set of client computers can be defined for database access rights management such that the users of such defined groups within the organizational entity share a common cryptographic key and key identifier.

In accordance with an embodiment of the invention the cryptographic key and its key identifier of a given user enables the user to access further cryptographic keys and their respective key identifiers. This is accomplished by storing such additional cryptographic keys in encrypted form on the database system together with the respective key identifiers.

Upon entry of the user's cryptographic key and key identifier into the client computer the key identifier is sent from the client computer to the database system. In response to receipt of the key identifier the database system returns the set of encrypted cryptographic keys that are assigned to the received key identifier such that the client computer can decrypt that additional set of cryptographic keys using the key that the user has entered. When a query is performed one or more of the additional key identifiers can be used as alternative or additional search criteria in order to include data items into the search that can be decrypted by one of the cryptographic keys that are available on the client computer.

In accordance with embodiments of the invention the application program is operational for generating an electronic signature for the encrypted data item and/or the key identifier. The database system is operational for checking the validity of the electronic signature and for executing the database insert command only if the electronic signature is valid. This provides an additional level of security against sabotage.

In accordance with alternative embodiments of the invention the application program is operational for generating an electronic signature for the unencrypted data item and/or the key identifier. The database system is not operational for checking the validity of the electronic signature, as it has no access to the unencrypted data item, and executes the database insert command without checking the validity of the electronic signature. The checking of the validity of the electronic signature is performed by the application program after retrieval and decryption of the data item. This also provides an additional level of security against sabotage.

In accordance with embodiments of the invention each set of client computers belongs to or constitutes a trusted entity and each set of client computers has its own dedicated set of users that are authorized with respect to that set of client computers. It is important to note that each entity as such is trusted and maintains the confidentiality of its own data items but that such trust does not exist between the various entities such that each one of the entities is prevented access to data items of another one of the entities.

In accordance with embodiments of the invention the database system is coupled to all sets of client computers via a network, such as a public network, in particular the Internet. The database system has a log-in component for logging-in the client computers.

A 'log-in component' of the database system is understood herein as encompassing any component of the database system for receiving authentication information, such as a username and password combination, and for establishing a database connection upon successful authentication. For example, upon receipt of a log-in command by the database system, the database system requests entry of the authentication information and establishes the database connection if the authentication information is correct.

It is important to note that the authentication information, i.e. the log-in information, is not user-specific in accordance with an embodiment of the present invention but it is client computer specific as the log-in information forms an integral part of the application program that is installed on any one of the client computers.

Providing the application programs with client computer specific log-in information rather than log-in information that is specific to the trusted environment has the advantage that removal or loss of one of the client computers from the trusted environment does not require to replace the log-in information in all of the remaining client computers within that trusted environment. Further, another advantage is that the assignment information used by the log-in component of the database system does only need to be updated by deleting the log-in information of the removed or lost client computer without a need to change the assignment information otherwise.

After a session via the network has been established between the application program and the database system, such as an internet session, the application program sends a log-in command to the database system in response to which the database system prompts the application program for sending the log-in information. In response, the application program reads the log-in information and sends the log-in information to the database system for checking and for establishing the database connection with one of the databases. It is important to note that such a log-in operation can be executed without the user's interaction as the user does not need to enter log-in information as the log-in information is client computer specific and forms an integral part of the application program. Hence a standard log-in function provided by the database system, such as a MySQL log-in function, is used not for logging in a user but for logging in the client computer on which the application program that comprises the log-in information is installed.

In accordance with embodiments of the invention the database system is partitioned into multiple databases where each one of the databases is assigned to one set of the sets of client computers. In other words, the database system comprises multiple databases and there is a one-to-one relationship between sets of client computers and databases. This serves as a protection of a database that is assigned to one of the sets of client computers from attacks, such as denial of service attacks, from one of the other sets of client computers and it limits the risk against sabotage, the infiltration of computer viruses and other malicious software to the individual databases while limiting the risk of spreading from one database to another.

The assignment of sets of client computers to databases is implemented by assignment information that is indicative of these assignments and which is accessible by the log-in component. The log-in component uses the authentication information, i.e. the log-in information, that it receives from a client computer for retrieval of the assignment of that client computer and thus the set to which it belongs to one of the databases. A database connection is then established between the application program of that client computer and the assigned database provided the log-in is successfully completed.

Each one of the databases stores encrypted data items whereby the encryption is performed with one of the user or user-group specific cryptographic keys of the security tokens. Each one of the encrypted data items is stored in conjunction with the key identifier, but not the key itself, that was used for encryption of the data item as an attribute. This facilitates to limit the search in the database for retrieval of an encrypted data item to such data items that have been encrypted by a given cryptographic key.

In accordance with embodiments of the invention a database query is generated by encrypting a search criterion with the entered key by the application program. The search can thus be executed by the respective database in the encrypted domain. In addition to the search criterion that is entered by the user the query is limited by the key identifier of the entered key, such that the database system only returns encrypted data items that not only match the encrypted search criterion but also the key identifier. This way the set of database hits that are returned in response to the query is limited to encrypted data items that have been encrypted with the key that is identified by the key identifier. This reduces the network load and avoids unnecessary data processing operations by the client computer, such as for attempting to decrypt and/or verify a encrypted data item that can in fact not be decrypted by the client computer.

In accordance with embodiments of the invention the client computers also have log-in components for providing an additional level of security. The client log-in components serve for logging in a user by means of user specific authorization information, such as a username/password combination and/or biometric user information. After user log-in into one of the client computers the user may start the application program that is installed on that client computer whereupon the user is prompted to present his or her security token.

The application program may then send an access command, such as a chip card command in the form of an APDU, to the security token for reading the cryptographic key and the key identifier stored on that security token of the user. The user must first authenticate against the security token in order to enable such a read access by the application program. This way it is ensured that the security token that is presented by the user is in fact the security token of that user.

After performance of the client computer specific log-in into the database system and the establishment of the database connection the user may perform multiple queries or insert data items while the cryptographic key and key identifier are stored in the working memory of the client computer. The cryptographic key and key identifier are automatically erased from the memory of the client computer and no copy is retained by the client computer when one of the following events occurs a time-out condition is fulfilled, e.g. a predefined time period of user inaction with respect to the application program has occurred, the database connection and/or the network session is interrupted, the application program is closed by the user or automatically by logging out the user, the power supply of the client computer is interrupted.

This can be implemented e.g. by the log-in component of the client computer or by the application program. This has the advantage that the user needs to present his or her security token only once after each log-in for ease of use of the system while a high level of security is maintained due to the fact that the cryptographic key that has been read in from the security token is automatically erased when the user is logged out.

In accordance with embodiments of the invention each client computer has a client log-in component for logging-in a user into the respective client computer upon receiving authentication information from that user, such as a username/password combination and/or biometric information, wherein the cryptographic key and the key identifier is entered into the client computer after logging-in that user and stored in the client computer until the user is logged-out. For example, the user is prompted to enter his or her cryptographic key and key identifier by the application program that is started after the user has logged in into the client computer.

In accordance with embodiments of the application the client computer specific log-in information of a client computer is stored in a configuration file of the application program that is installed on that client computer, such as an INI file, a registry or an XML.config file of the application program.

In accordance with embodiments of the invention each security token has a secure memory area in which a private key of an asymmetric cryptographic key pair assigned to that security token and its user is stored. Further, the security token has a processor for generating an electronic signature using that private key. Such an electronic signature is also referred to as a digital signature. For insertion of a data item into the respective database a signature of that data item is generated using the security token and stored in the database together with the encrypted data item. When the encrypted data item is retrieved at a later point of time by the same user or a user that belongs to the same user-group the validity of that signature can be checked by the application program after decryption of the data item.

Embodiments of the invention may be particularly advantageous as they may enable the efficient and secure storage of confidential data, such as medical records, in the cloud.

The term 'cloud' as understood herein encompasses any database system that is accessible via a network, such as the Internet, and that is outside the control and responsibility of the organizational entities, such as health service providers, that utilize that database system. Embodiments of the invention are particularly advantageous as the storage of confidential data, such as medical records, in the cloud, i.e. a third party storage system or network, is enabled while fulfilling all regulatory requirements as to the maintenance of confidentiality. In particular, the third party that operates the database system does not need to be a trusted entity in terms of maintenance of confidentiality, authenticity and integrity of the data.

In accordance with another embodiment of the invention, the application program is comprising client computer specific log-in information, wherein the client computer further comprises:

a communication interface for receiving a user or user-group specific key and a key identifier of that cryptographic key, wherein the first cryptographic key is corresponding to such a user or user-group specific key, the communication interface being operational for manual entry of user information specifying the user or user-group specific key and a key identifier and/or for communication with one security token (STik) of a set of security tokens, the security token being assigned to one authorized user, a user or user-group specific key and a key identifier of that cryptographic key being stored on the security token, a network communication interface for communication with a database system comprising the data-base, the application program being operational to perform the following steps for writing the first data item to the database system:

entry of the first data item into the client computer, encrypting the first data item with the key that has been entered into the client computer, generating a database insert command, the insert command comprising the encrypted first data item and the key identifier of the key with which the first data item has been encrypted as an attribute of the encrypted data item for storing the encrypted first data item in the database system with the key identifier as an attribute, establishing a session with the database system over the network by the network communication interface, transmitting the insert command via the session to the database system for processing by the one of the databases that has been determined to be assigned to the client computer by the log-in component such that the encrypted first data item with the key identifier is stored in that data-base, the application program being operational to perform the following steps for reading the first data item:

establishing a session with the database system over the network, transmitting the client computer specific log-in information to the database system via the session, entry of the key and the key identifier from one of the security tokens into the client computer for use of the key by the client computer and without transmitting the key to the database system;

entry of a search criterion into the client computer, generating a database query using the search criterion and the key identifier, the key identifier limiting the query to encrypted data items that have an attribute matching the key identifier, in response to the query, receiving an encrypted first data item matching the search criterion from the database system, decrypting the encrypted data item using the cryptographic key.

In accordance with embodiments of the invention the cryptographic key or the cryptographic keys that are stored on a client computer for encryption and/or decryption of data items are automatically erased from the memory of that client computer if the user closes the application program running on that client computer, the user is logged off by the operating system of the client computer, such as when a timeout condition is fulfilled due to an extended phase of user inaction, and/or when the power supply is switched off or becomes unavailable, such as when the client computer is switched off or the storage capacity of the battery that powers the client computer is exhausted. Preferably, the at least one cryptographic key for the encryption and/or decryption of the data items is stored in volatile memory of the client computer such that it is ensured that the at least one key is erased when the power supply is switched off or becomes unavailable, such as when the client computer is a mobile battery powered device and its batteries become exhausted.

Automatically erasing the at least one key from the memory of the client computer is particularly beneficial if the client computer is utilized outside the trusted environment, such as for terrestrial use in vehicles or on foot. In such a situation it may occur that a user leaves his or her client computer unattended. Automatically erasing the at least one key from the client computer such as when a timeout condition is fulfilled provides an additional level of security. Even if an unauthorized party gets into the possession of the client computer which has been lost by an authorized user or that was stolen the unauthorized party cannot access or decrypt the encrypted data items that are stored on the database system if the key has been erased from the memory of that client computer before the unauthorized party gets into the possession.

In accordance with further embodiments of the invention the at least one key is erased from the memory of the client device in response to a respective command received from the user in order to enable another authorized user to utilize that client device while preventing access of to the data items of the previous user. This has the additional advantage of making a user log-in of the operating system, such as a Windows log-in, superfluous or unnecessary, as entering the cryptographic key that is assigned to one of the users for encryption and/or decryption of data items de facto also serves as a log-in credential for utilizing a given one of the client computers.

Embodiments of the invention are particularly advantageous as confidentiality, authenticity and integrity of the data items that are stored by the database system are maintained even though the database system may be under the control of an un-trusted third party. In addition, embodiments of the invention also provide protection against inter-customer vandalism by partitioning the database system into separate databases which are assigned to individual customers, i.e. organizational entities, such as health service providers.

Furthermore, embodiments of the present invention provide protection against unintentional erroneous data storage operations as well as against intentional sabotage, such as erasing data from one of the databases. This is accomplished by a database log that tracks database changes such that an earlier status of a database can be reconstructed from the database log.

In another aspect, the invention relates to a method of querying by a client computer a database stored on a server, the server being coupled to the client computer via a network, wherein the database comprises a set of first relations, wherein each first relation in the set of the first relations comprises first data items, wherein for each first relation the first data items are encrypted with a respective first cryptographic key in the first relation, wherein the first data items form a partially ordered set in each first relation, in each first relation the partial order being formed with respect to the first data items of said first relation in non-encrypted form, wherein the client computer has installed thereon an application program, the application program performing:

a) receiving a search request, said search request specifying a search interval, a number of maximum total hits and a search direction, b) declaring the infimum as the interval boundary in case the search direction is ascending with respect to the order in which the encrypted first data items are stored in said first relations or declaring the supremum as the interval boundary in case the search direction is descending with respect to the order in which the encrypted first data items are stored in said first relations, c) determining for each first relation the encrypted first data item forming the interval boundary, wherein the determining of the encrypted first data item forming the interval boundary is performed by requesting for each first relation encrypted current first data items, receiving and decrypting said requested encrypted current first data items and determining, using the partial order of the first relation, if one data item of the decrypted current first data items forms the interval boundary, d) in case the interval boundary cannot be determined from the decrypted current first data item, repeating step c), wherein said determining results in a set of current decrypted first data items comprising one of the current decrypted first data items for each first relation forming the interval boundary, e) selecting as a current hit data item the decrypted current first data item from the set of current decrypted first data items which forms the interval boundary with respect to the set of current decrypted first data items, in case said decrypted current first data item is lying in the interval, and removing the current hit data item from the set of current decrypted first data items, f) in case the total number of selected current hit data items is below the number of maximum total hits, providing a request for a new encrypted first data item, wherein the request for the new encrypted first data item comprises information that the new encrypted first data item is to be retrieved from the first relation comprising the current encrypted first data item corresponding to the current hit data item at a position in the partial order immediately preceding or succeeding the position of the current encrypted first data item corresponding to the current hit data item, depending if the interval boundary is the supremum or the infimum, and in response to said provision of the request for the new encrypted first data item, receiving the new encrypted first data item, decrypting the new encrypted first data item for obtaining a new decrypted first data item as the current decrypted first data item and adding said current decrypted first data item to the set of current decrypted first data items, g) repeating steps e)-f) while the total number of selected current hit data items is below the number of maximum total hits and the current hit data item is satisfying the interval.

In another aspect, the invention relates to a client computer for updating a first relation comprised in a database stored on a server with an update first data item, the server being coupled to the client computer via a network, wherein the first relation comprises first data items, wherein the first data items are encrypted with a first cryptographic key in the first relation, wherein the first data items form a partially ordered set in the first relation, the partial order being formed with respect to the first data items in non-encrypted form, wherein the client computer has installed thereon an application program, the application program being operational for:

i. sequentially requesting and decrypting encrypted first data items, wherein each request of the sequential requesting is performed by comparing the position of the update first data item in the partial order with the position of the decrypted first data items in the partial order, wherein the sequential requesting is performed until a position in the partial order for storing the update first data item in the first relation is determined, ii. in case a position for storing the update first data item in the first relation is determined, providing a storage request to the data-base, the storage request comprising the encrypted update first data item and the position determined in step i).

Here, comparing the position in the partial order may be done by comparing the update first data item to the decrypted first data items and deciding whether to request a predecessor or a successor of the current decrypted first data item. Further, the sequential requesting may be repeatedly performed until a position in the partial order is determined for storing the update first data item in the first relation such that the order's consistency with respect to the partial order is still given after storing the update first data item. The 'positions' of the first data items are given by the partial order.

This may allow for maintenance of the first relations by updating the first relations with new data items. However, also the updating of the first relations can be performed without any knowledge of the respective cryptographic key by the database. For updating, the database has not to be aware of the first cryptographic key or the plain text content of the first data items. Thus, there is no risk of compromising the first data items at the database. Any decision where to store the update data items in a relation is made only by the client. Thus, maintaining the partial order in each first relation when updating with new data items is done and ensured by the client.

In accordance with an embodiment of the invention, step i) comprises:

a) requesting a current encrypted first data item from the data-base, b) in response to said requesting of the current encrypted first data item, receiving from the database the current encrypted first data item, c) decrypting the current encrypted first data item for obtaining a current decrypted first data item, d) in case the update first data item is located at a position in the partial order preceding the current decrypted first data item, providing a request for determining the availability of a new encrypted first data item in the first relation immediately preceding the current encrypted first data item, e) in case the update first data item is located at a position in the partial order succeeding the current decrypted first data item, providing a request for determining the availability of a new encrypted first data item in the first relation immediately succeeding the current encrypted first data item, f) in case the new encrypted first data item is available in the first relation, requesting the new encrypted first data item and in response to said requesting receiving the new encrypted first data item, and repeating steps c)-f) with the current encrypted first data item in step c) being the new encrypted first data item, g) in case the new encrypted first data item is unavailable in the first relation, encrypting the update first data item with the first cryptographic key for obtaining an encrypted update first data item and providing the storage request of step ii) to the server, the storage request comprising the encrypted update first data item and a position information, the position information instructing the server to store the encrypted update first data item in the first relation at a position in the partial order immediately preceding or succeeding the position of the current encrypted first data item, depending if the update first data item is preceding or succeeding the current decrypted first data item with respect to the partial order.

In case of the first data items forming a partial ordered set in said first relation via a rooted tree, said first data items are ordered in the tree with the encrypted first data items being described by nodes in various depths. In this case, it is well understood that requesting any encrypted first data item preceding or succeeding a current encrypted first data item corresponds to requesting a node describing an encrypted first data item preceding or succeeding the node comprising the current encrypted first data item at a depth of the tree which is larger by for example one level than the depth of the node of the current encrypted first data item.

In accordance with an alternative embodiment of the invention, step i) comprises:

a) requesting a current encrypted first data item from the data-base, b) in response to said requesting of the current encrypted first data item, receiving from the database the current encrypted first data item, c) decrypting the current encrypted first data item for obtaining a current decrypted first data item, d) providing a request for a new encrypted first data item, wherein the request for the new encrypted first data item comprises information that the new encrypted first data item is to be retrieved from a position in the partial order immediately preceding or succeeding the position of the current encrypted first data item, depending if the update first data item is preceding or succeeding the current decrypted first data item with respect to the partial order, and in response to said provision of the request for the new encrypted first data item, receiving and decrypting the new encrypted first data item, e) in case the update first data item is not located at a position in the partial order between the position of the new decrypted first data item and the current decrypted first data item, repeating steps c)-d) with the new encrypted first data item being the current encrypted first data item in step c), until the update first data item is located at a position in the partial order between the position of the new decrypted first data item and the current decrypted first data item, f) encrypting the update first data item with the first cryptographic key (18) for obtaining an encrypted update first data item, wherein step ii) comprises g) providing the storage request to the database, the storage request comprising the encrypted update first data item and a position information, the position information instructing the database to store the encrypted update first data item in the first relation at a position in the partial order between the new decrypted first data item and the current decrypted first data item.

In this case, the partial order is given for example by a linear order formed with respect to the first data items in non-encrypted form.

In accordance with an embodiment of the invention, information content is associated with the update first data item, wherein the database further comprises a second relation, wherein the second relation comprises second data items, wherein the second data items are encrypted with a second cryptographic key, wherein a referential connection exists assigning each encrypted first data item to at least one of the second data items stored encrypted in the second relation, wherein further information content is comprised in the second data items, wherein the application program is further operable for encrypting the information content associated with the update first data item with the second cryptographic key, wherein the storage request further comprises an instruction to the server to store the encrypted information content associated with the update first data item in the second relation and to provide the update first data item stored encrypted in the first relation with a referential connection to the encrypted information content associated with the update first data item in the second relation.

In another aspect, the invention relates to a for updating a first relation comprised in a database stored on a server with an update first data item, the server being coupled to the client computer via a network, wherein the first relation comprises first data items, wherein the first data items are encrypted with a first cryptographic key in the first relation, wherein the first data items form a partially ordered set in the first relation, the partial order being formed with respect to the first data items in non-encrypted form, wherein the client computer has installed thereon an application program, the application program being operational for:

i. sequentially requesting and decrypting encrypted first data items, wherein each request of the sequential requesting is performed by comparing the position of the update first data item in the partial order with the position of the decrypted first data items in the partial order, wherein the sequential requesting is performed until a position in the partial order for storing the update first data item in the first relation is determined, ii. in case a position for storing the update first data item in the first relation is determined, providing a storage request to the data-base, the storage request comprising the encrypted update first data item and the position determined in step i).

In another aspect, the invention relates to a computer program product comprising computer executable instructions to perform the steps as described above.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer de-vice via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution sys-tem, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a pro-gram which causes a processor to perform an aspect of the present invention. Computer executable code for carrying out operations for aspects of the present invention may be written in any combination of one or more programming languages, including an object oriented programming language such as Java, Small-talk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer pro-gram products according to embodiments of the invention. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Within the context of the present invention, a database index is a data structure that improves the speed of data retrieval operations. Indices may be created using one or more columns of a database table, providing the basis for both rapid random lookups and efficient access of data items.

It is understood in advance that although this disclosure includes a detailed description on cloud computing in FIGS. 4 and 5, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

It is understood that one or more of the aforementioned embodiments of the invention may be combined as long as the combined embodiments are not mutually exclusive.

In the following, preferred embodiments of the invention are described in greater detail by way of example only using the following figures in which.

Figure 4:
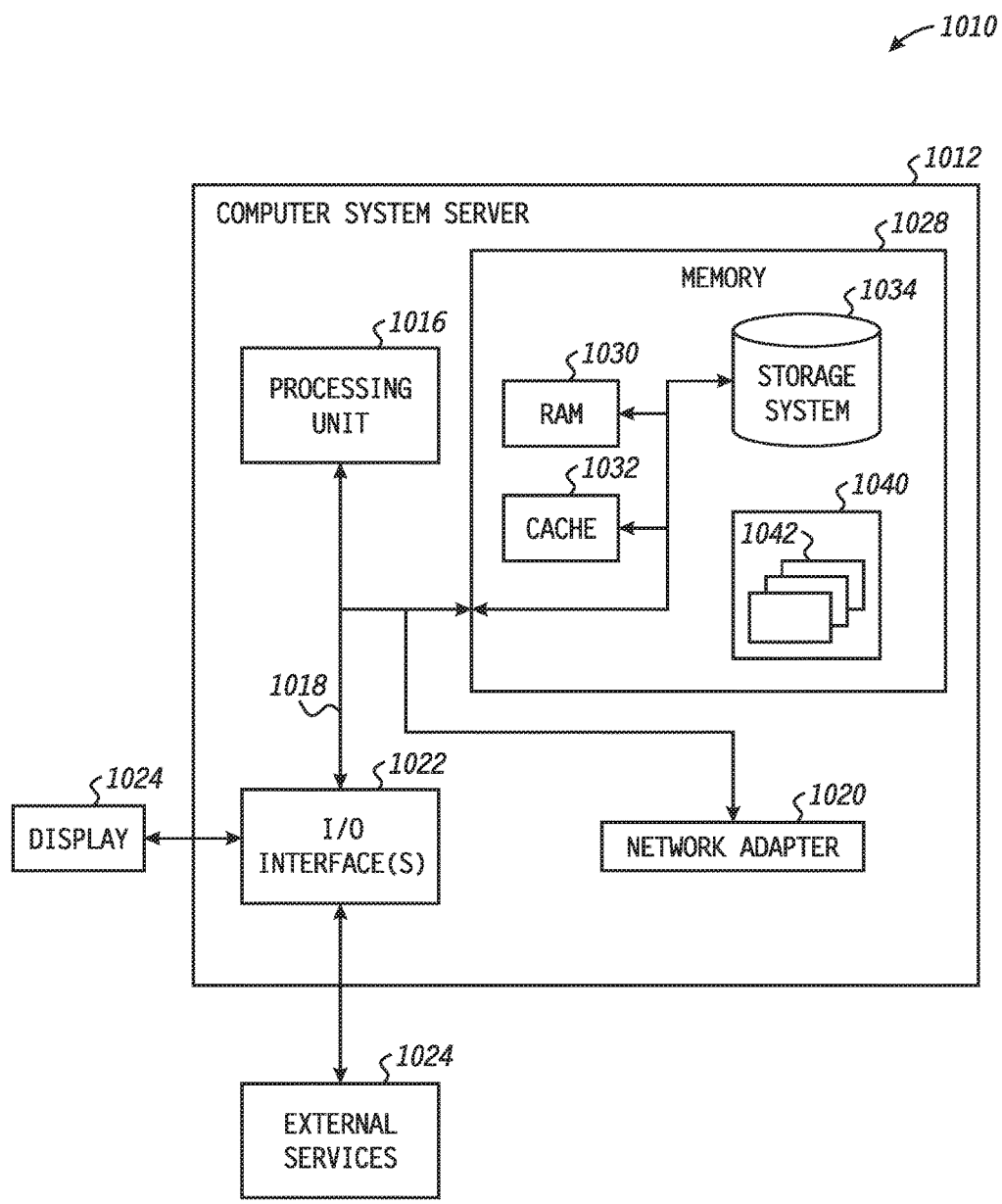
Figure 5:
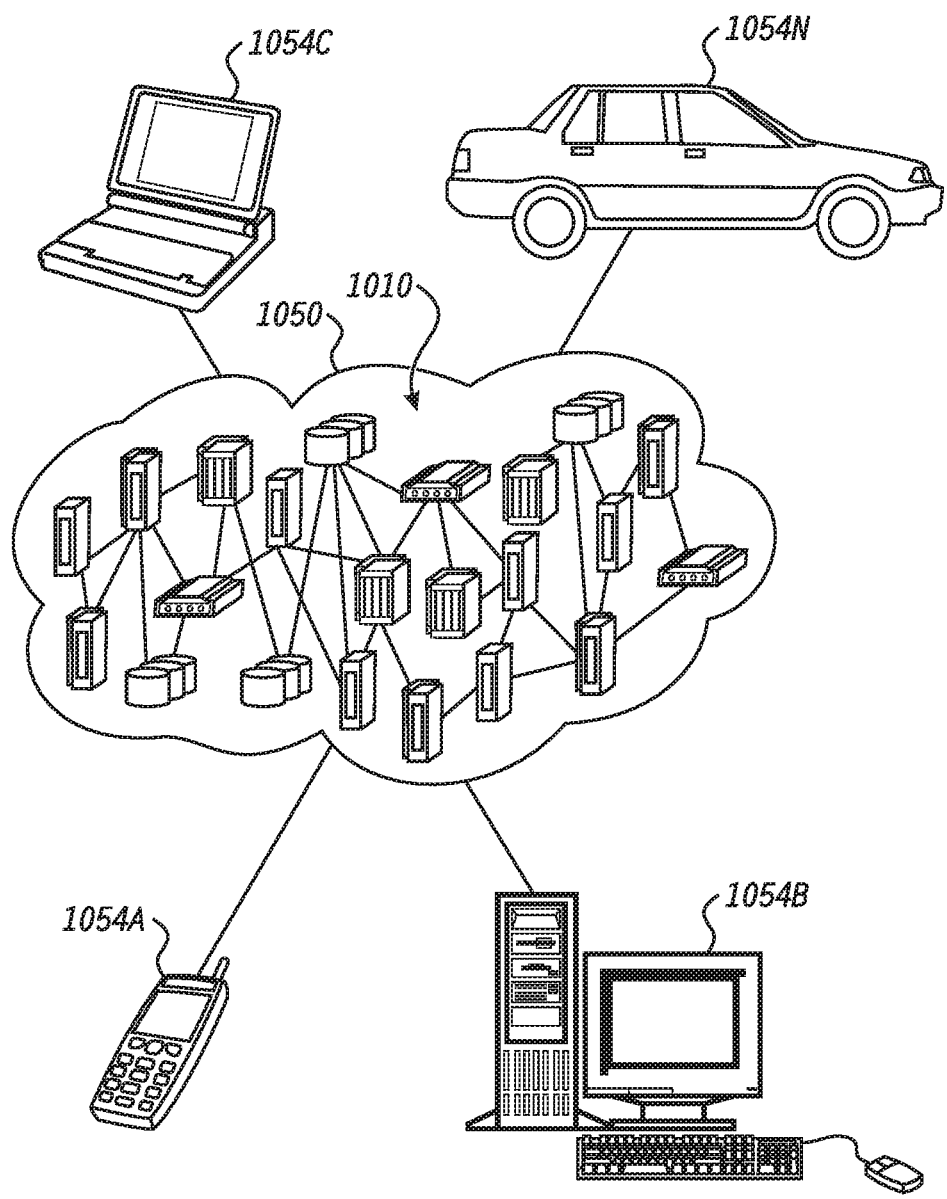
Figure 6:
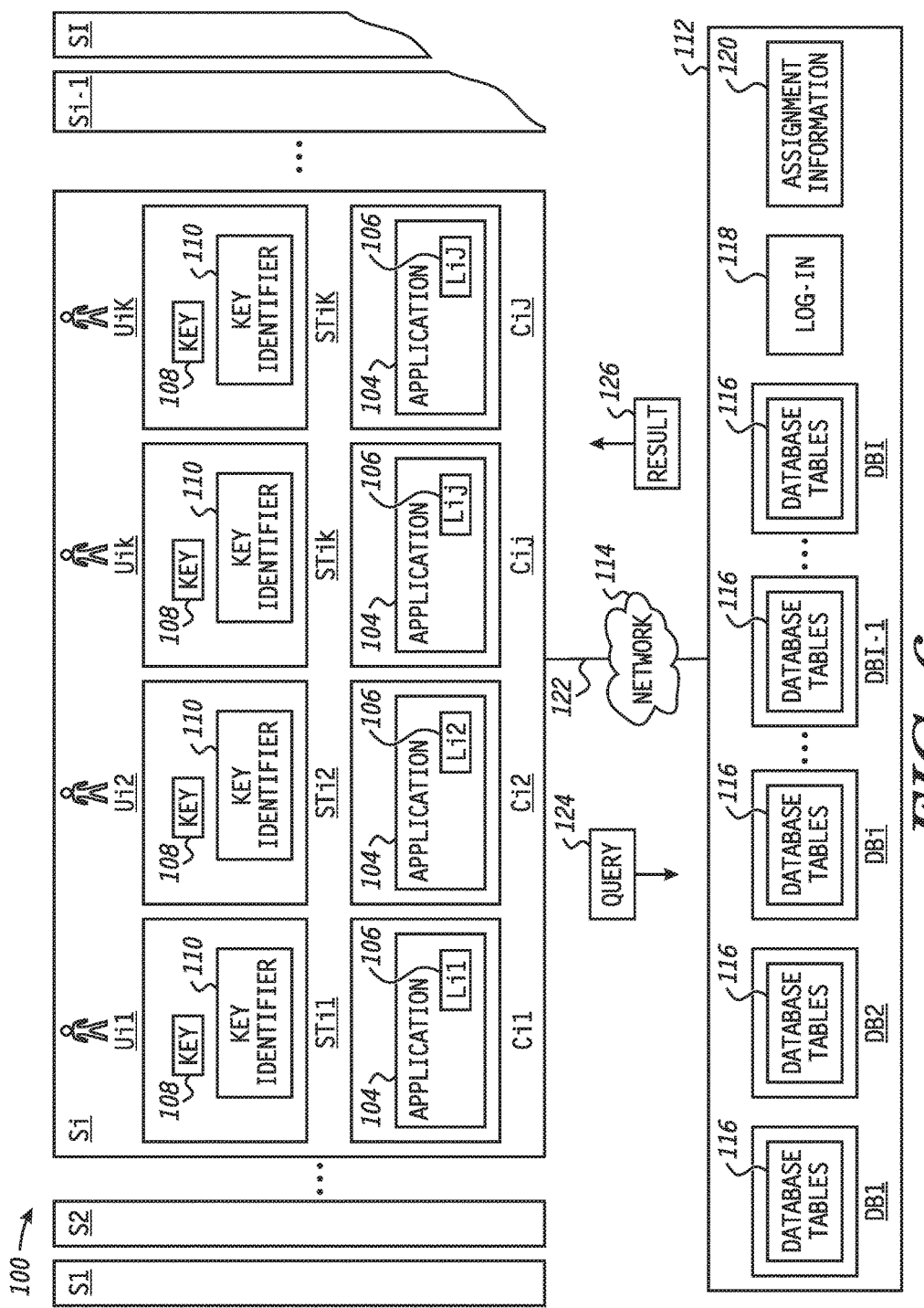
Figure 7:
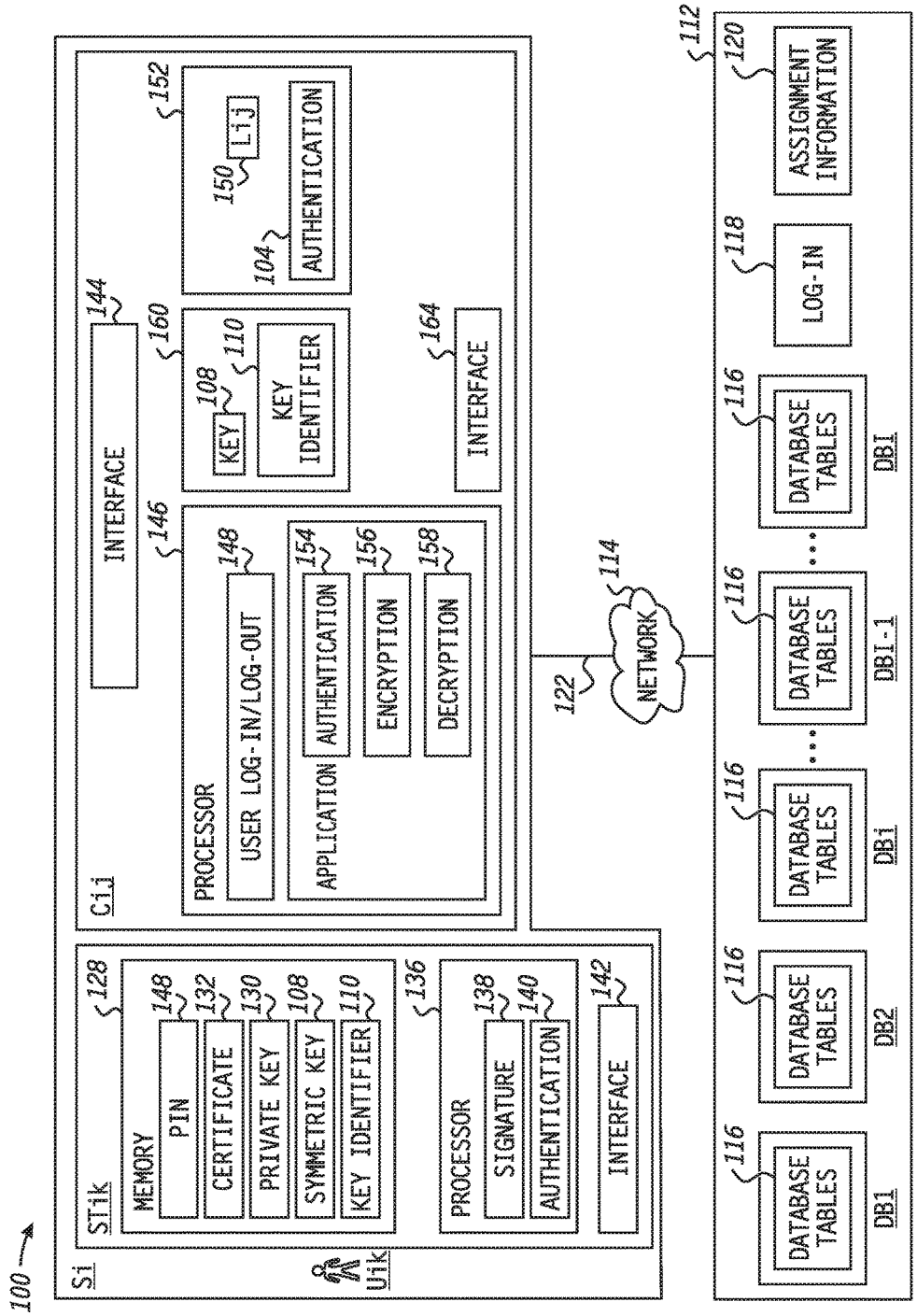
Figure 8:
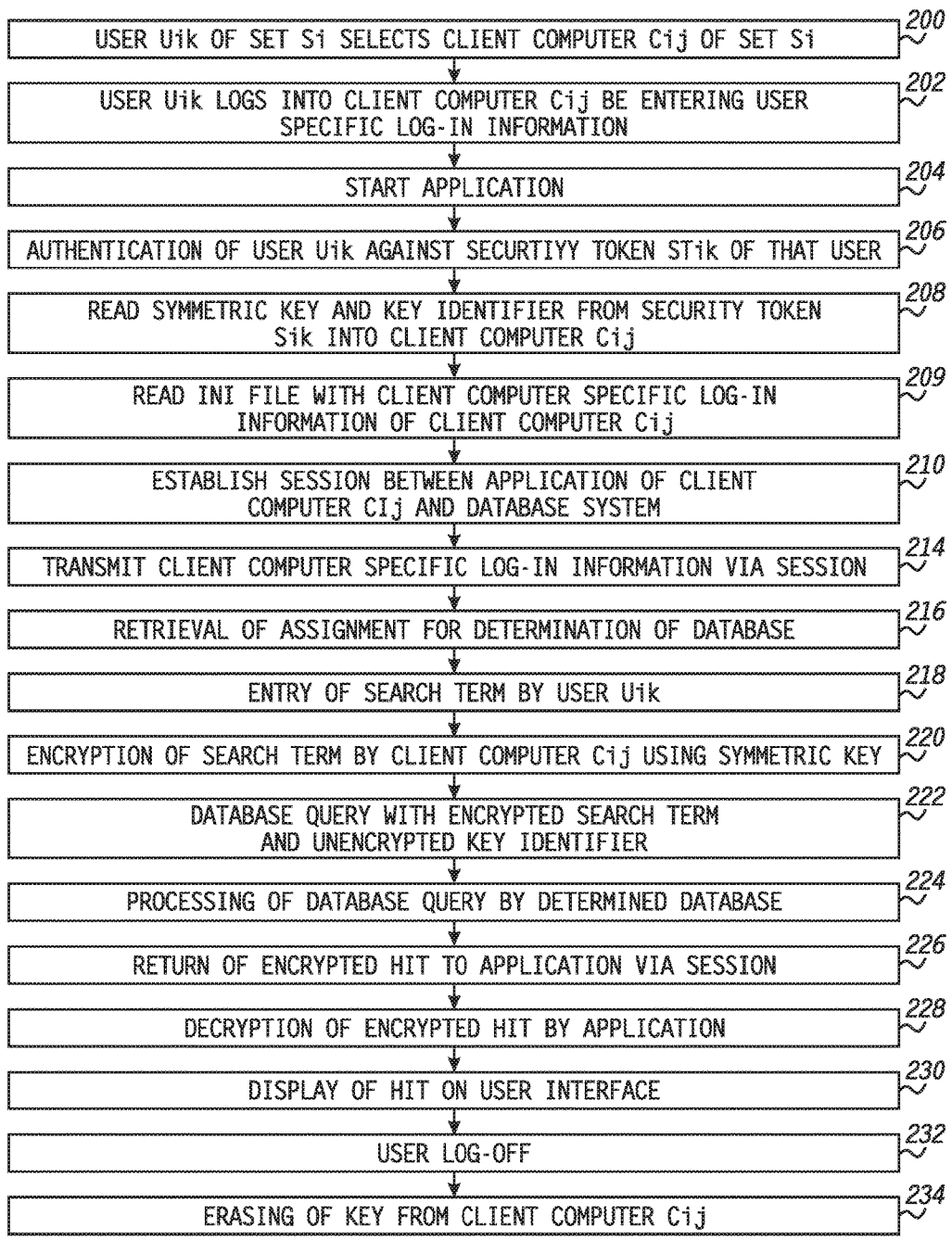
Figure 9:
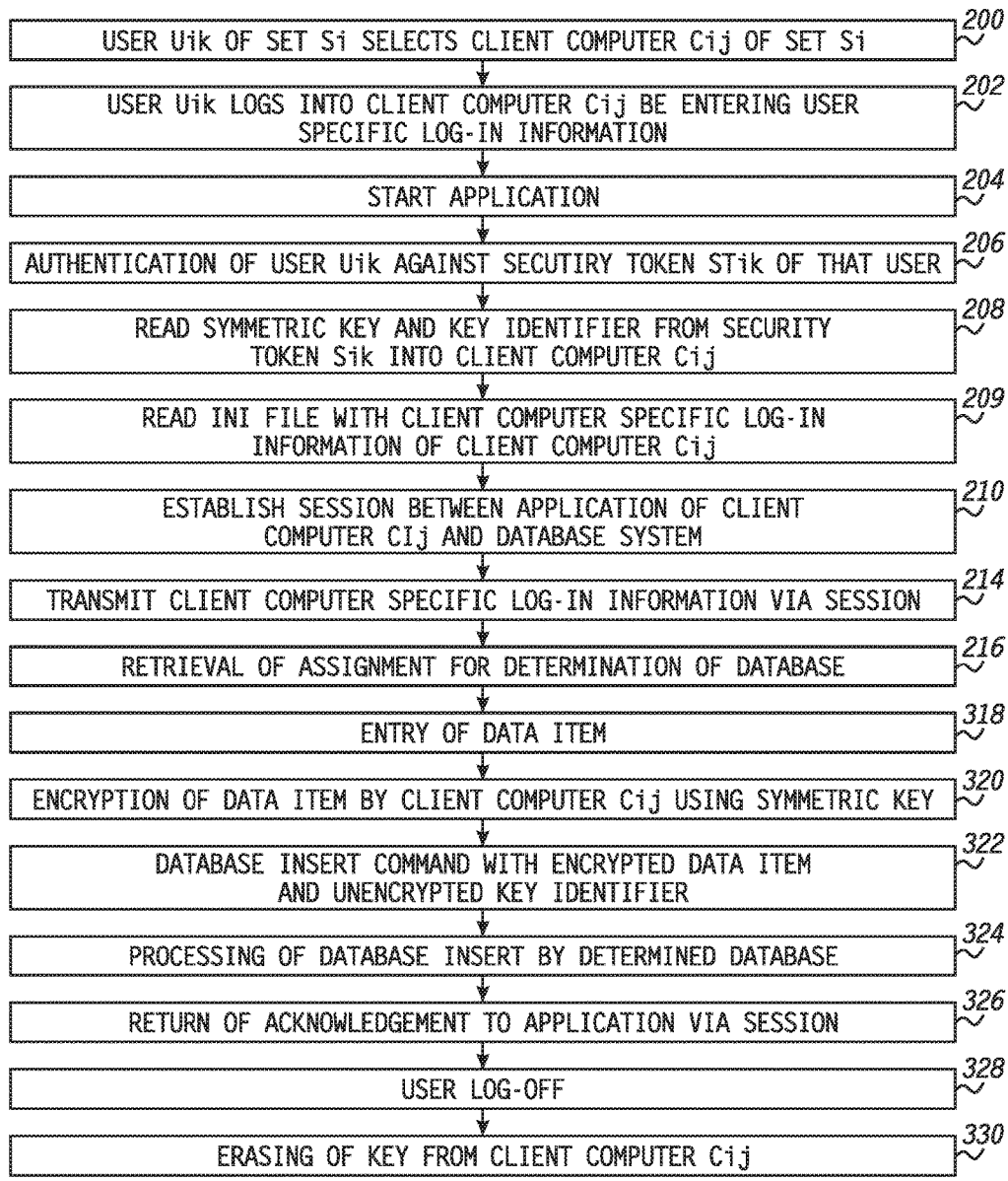
Figure 10:
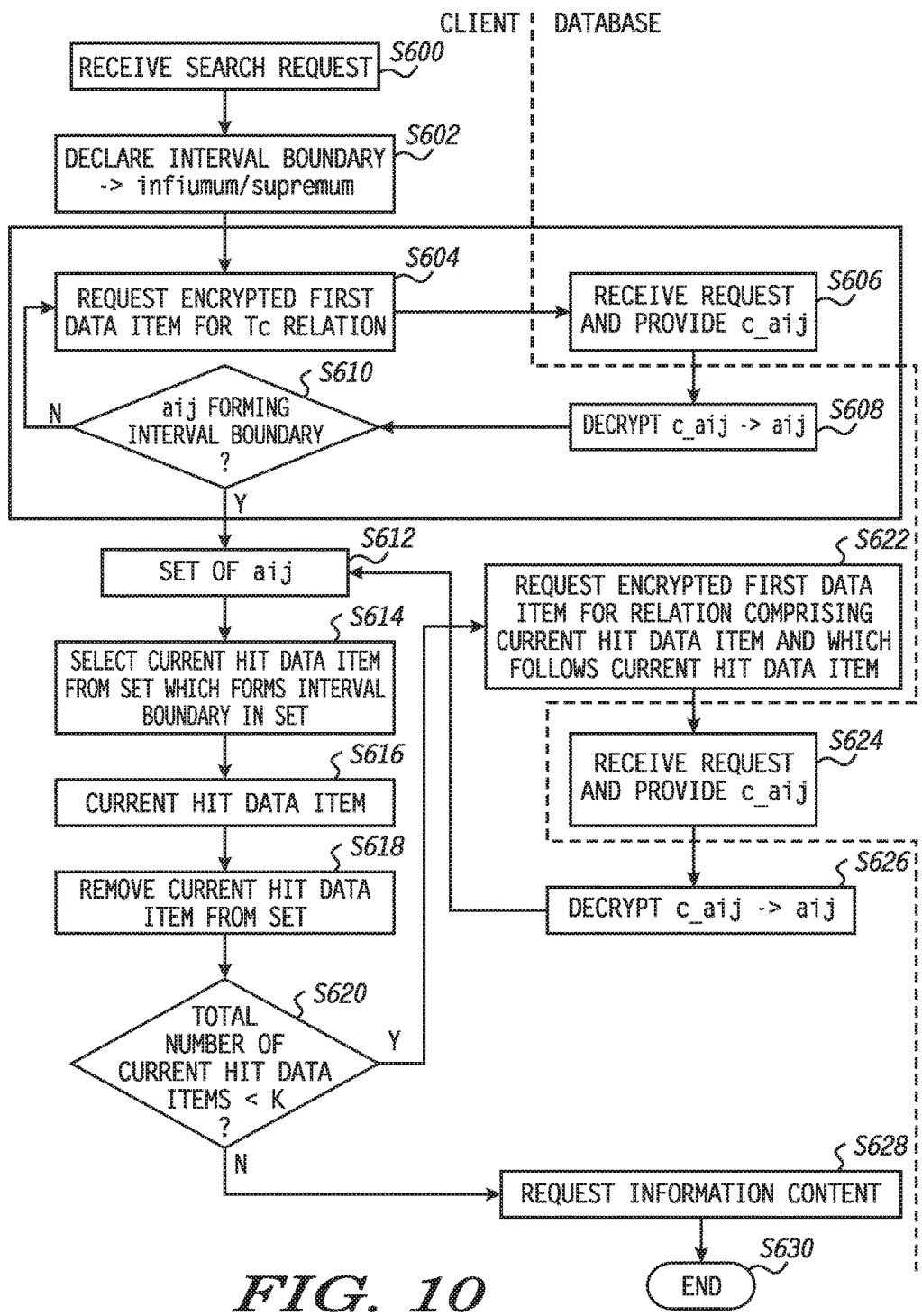
Figure 11:
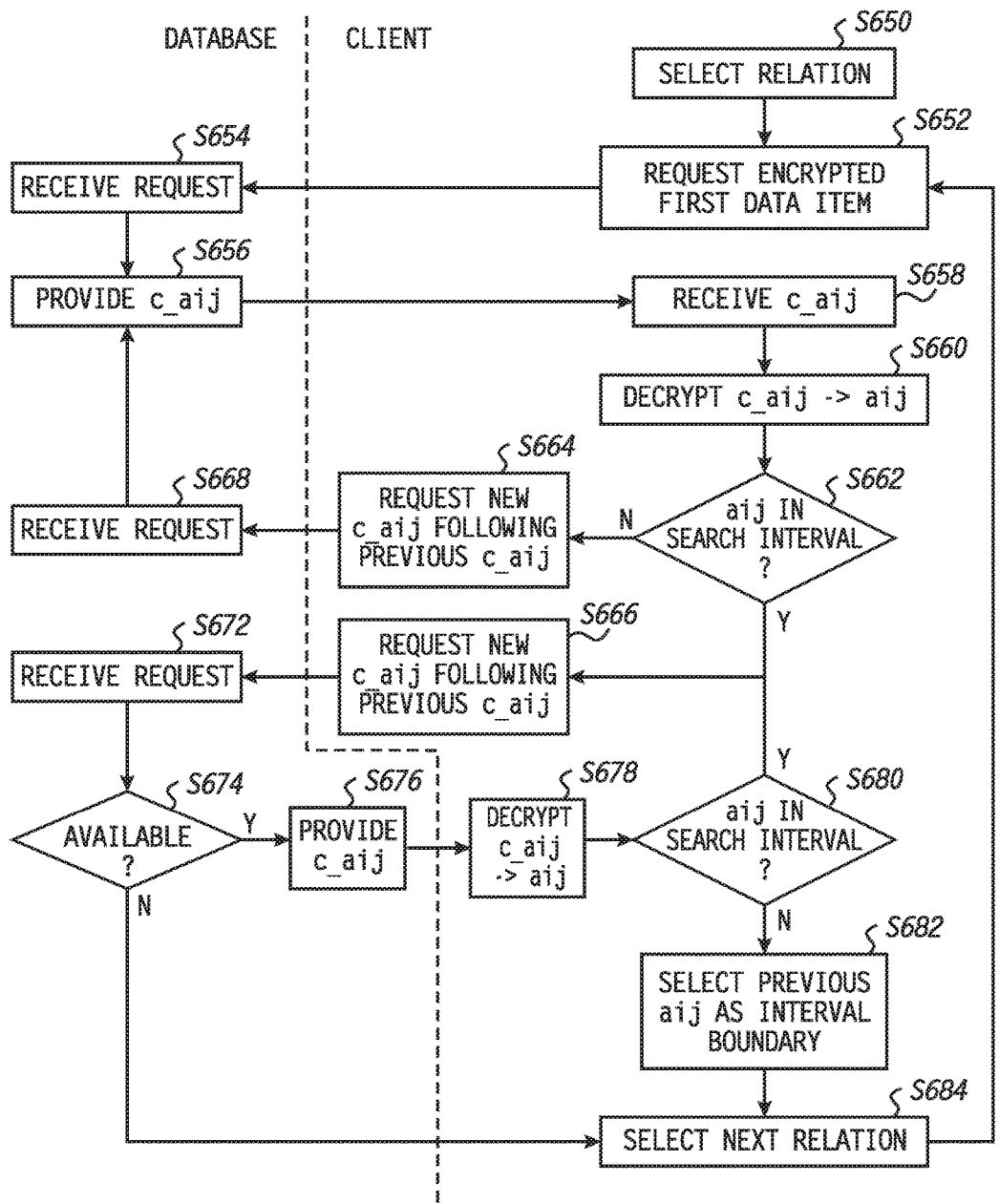
Figure 12:
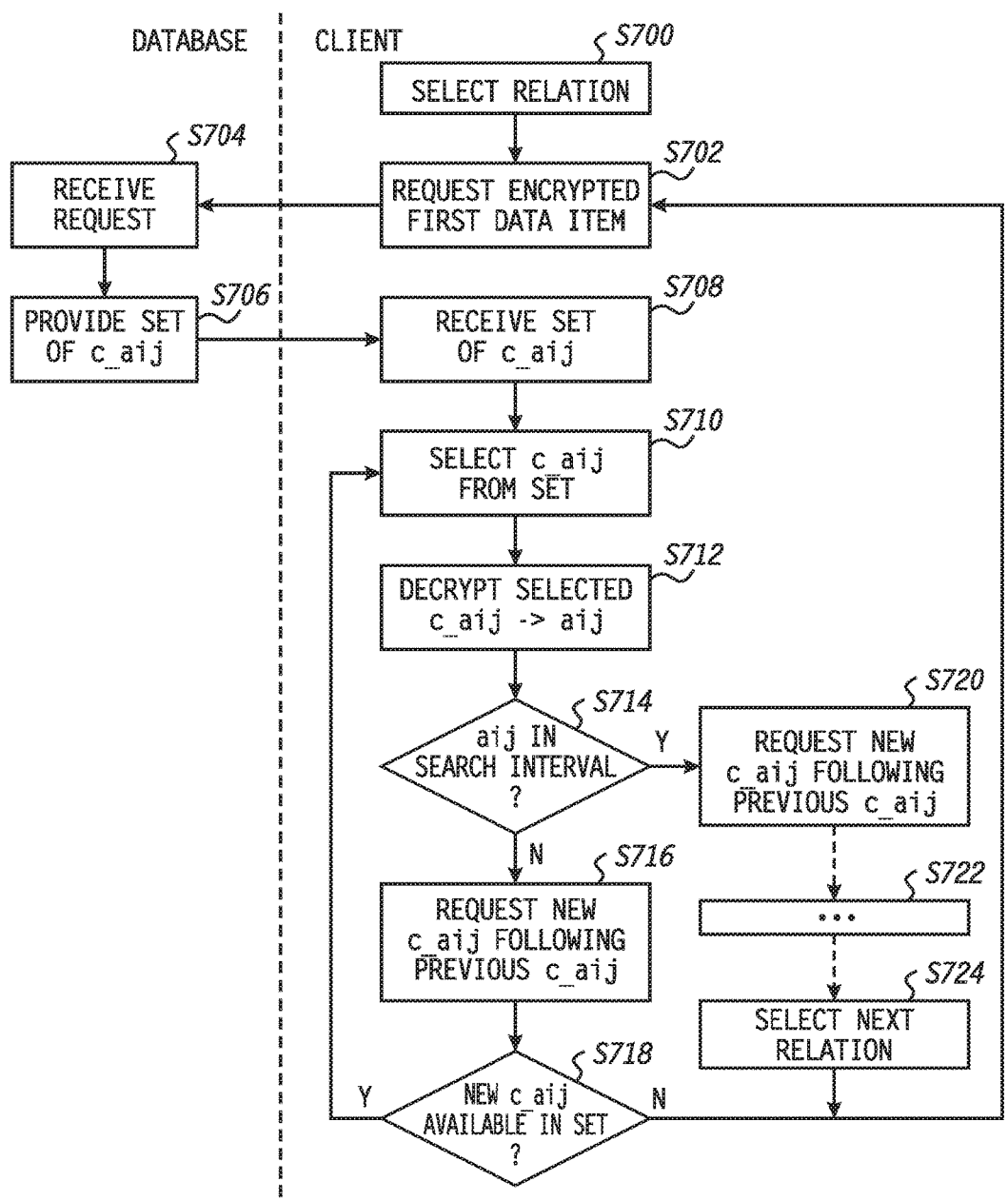
Figure 13:
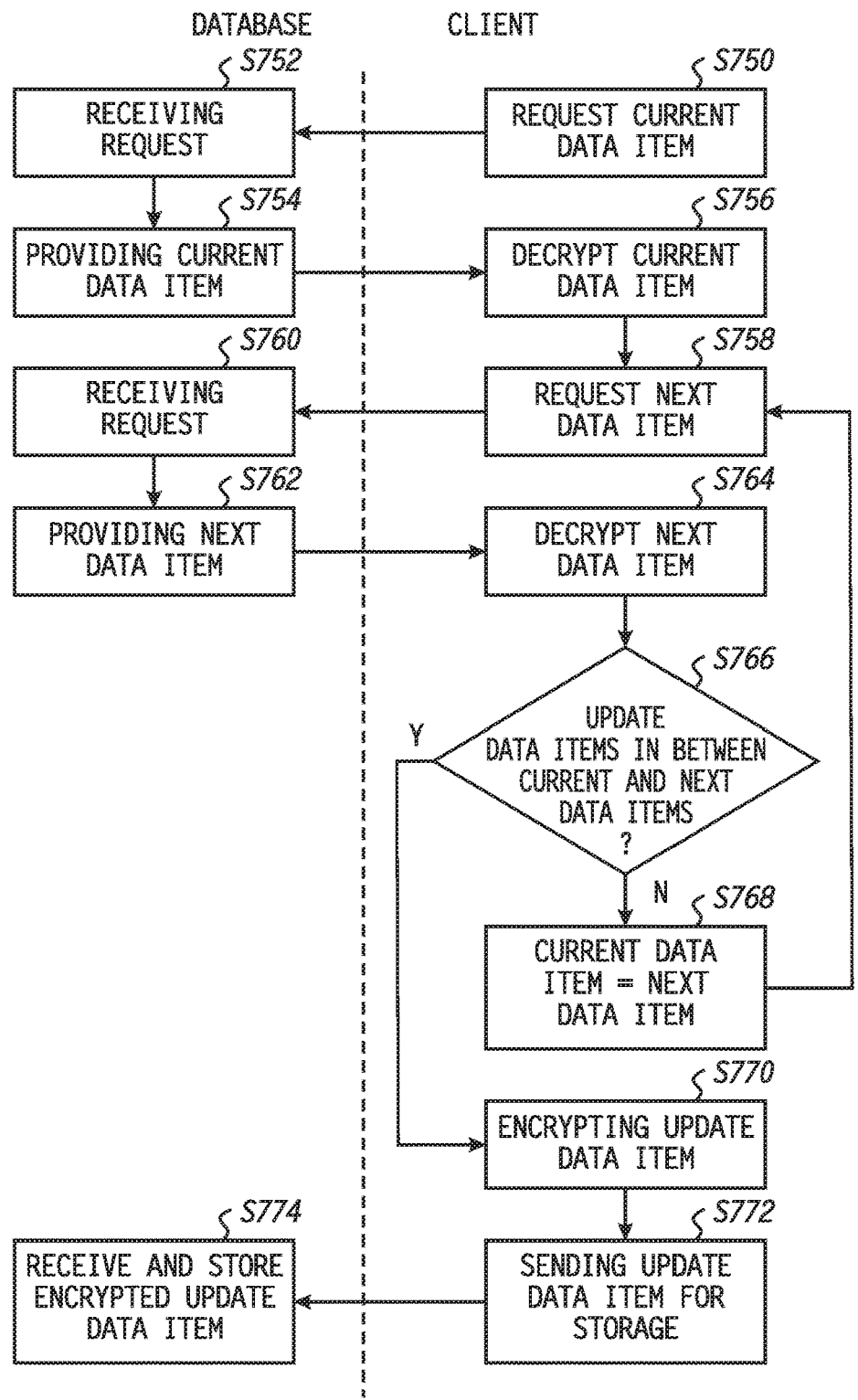
Figure 14:
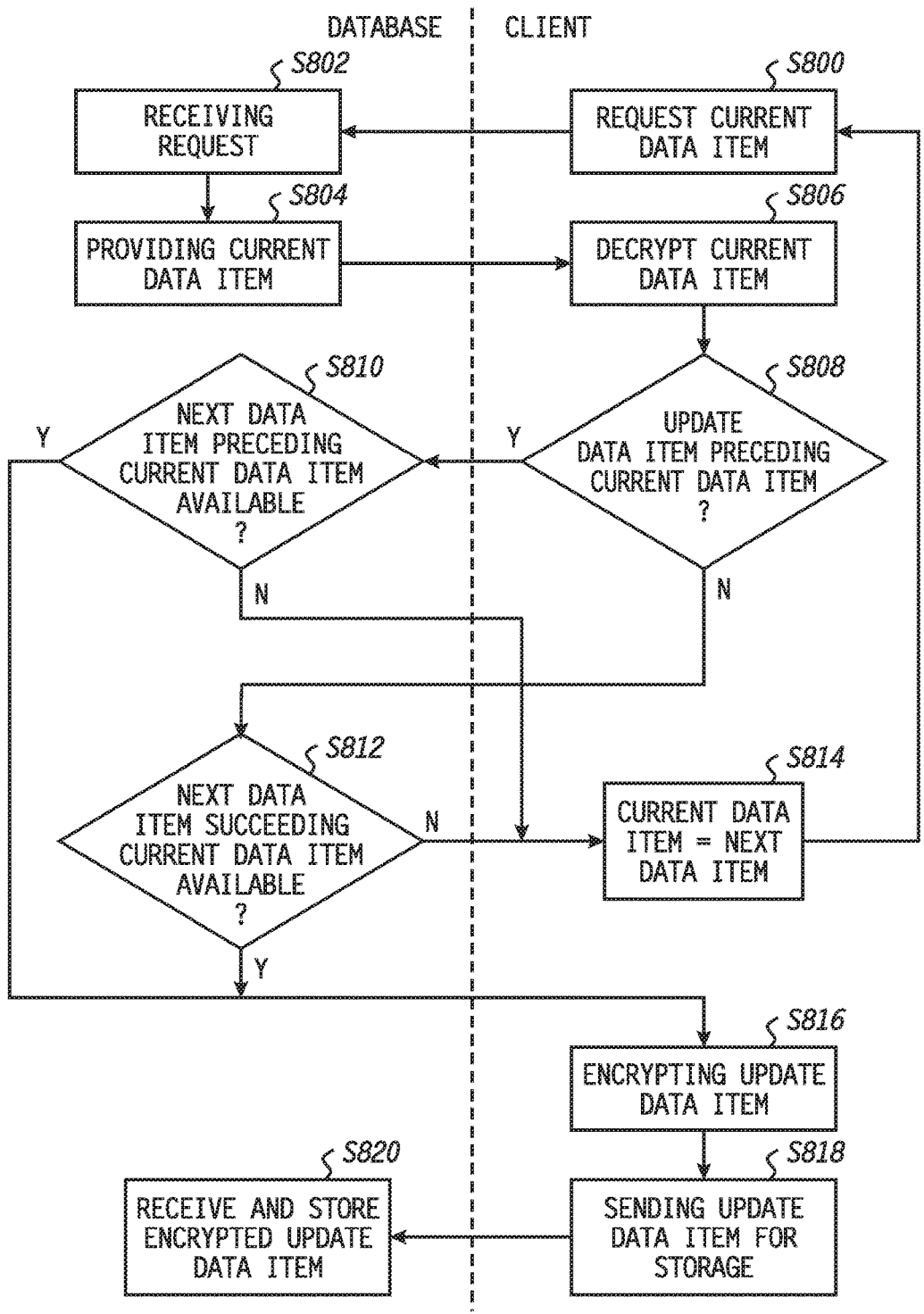

FIG. 4 depicts a cloud computing node according to an embodiment of the pre-sent invention, FIG. 5 depicts a cloud computing environment according to an embodiment of the present invention, FIG. 6 is a block diagram of a computer system as described above, FIG. 7 is a more detailed block diagram being illustrative of a client computer system, FIG. 8 is a flow diagram illustrating a method for retrieval of an encrypted data item, FIG. 9 is a flow chart being illustrative for storing an encrypted data item in the database system, FIG. 10 is a flow chart illustrating steps of querying a data-base, FIG. 11 is a flow chart illustrating steps of selecting interval boundaries, FIG. 12 is a flow chart illustrating steps of selecting interval boundaries, FIG. 13 is a flow chart illustrating steps of updating a data-base, FIG. 14 is a flow chart illustrating steps of updating a data-base.

Throughout the following description of various embodiments of the invention identical reference numerals are used for designating like or identical elements.

Figure 1:
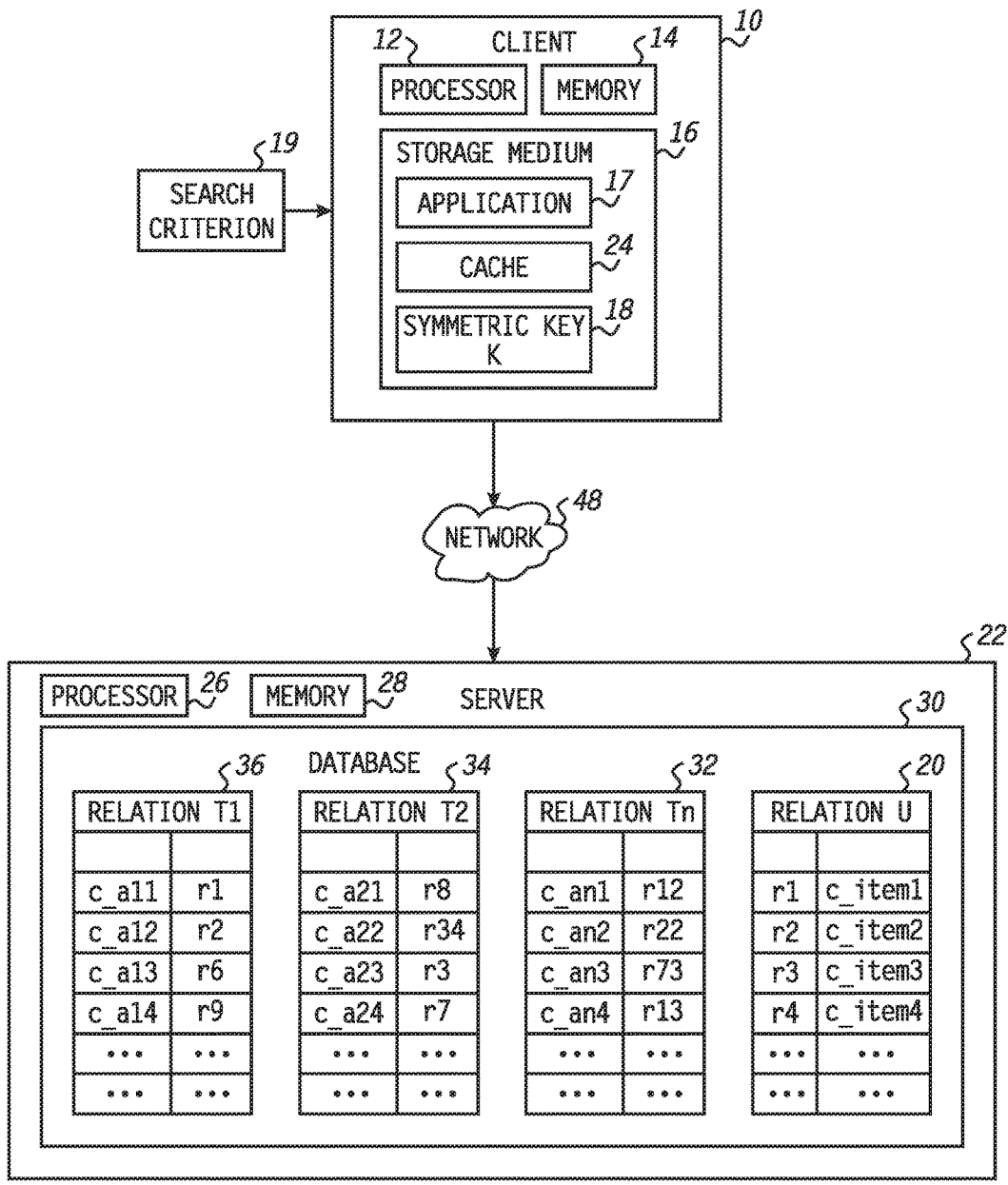
FIG. 1 illustrates a computer system for querying a data-base.

FIG. 1 illustrates a computer system comprising a client computer 10 and a database 30 stored on a server 22. The server 22 is coupled to the client computer 10 via a network 48. The database 30 comprises a first relation 36, called T1, which in the example of FIG. 1 is a table with two columns. Further, the database 30 comprises further first relations 32 and 34, named T2 and Tn which are also tables which each comprise two columns. Finally, the database 30 comprises a relation U designated by reference numeral 20 which also comprises two columns.

From the nomenclature of the first relations T1, T2, Tn it becomes clear that in between T2 and Tn the database may comprise multiple additional first relations T3, T4, T5, . . . which however are not shown in FIG. 1.

The client has a processor 12 and a memory, like for example a RAM memory 14. Further, the client 10 has a storage medium 16 stored thereon an application 17 and a symmetric key K 18. The storage medium further comprises a cache 24 which purpose will be described later.

Similarly, the server 22 has a processor 26 and a volatile memory 28. It has to be noted here, that for the given examples the usage of a symmetric key is assumed. However, the explained concept is also applicable for usage of asymmetric key pairs instead of a symmetric key.

Without restriction to generality, in the following it is assumed that the computer system is located in a medical environment. For example, the client 10 may be part of a medical office or a hospital and the database 30 of the server 22 is located in an external database center, like a cloud computing center. Thus, the client 10 and the server 22 are located in different locations.

Also, without restriction to generality it is assumed that the first relation 36 stores as attributes last names $a1j$ in encrypted form ($c\_a1j$; $j=1 \ldots m$) and referential connections $r1 \ldots rm$. The referential connections assign each first data item $a1j$ (i.e. each name) to an encrypted data item $c\_item$ stored in the second relation U (reference numeral 20).

A search criterion (reference numeral 19) may be a request for a certain interval of patient names, for example a part of a last name of a patient plus a wildcard. An example would be the search for the last name "Lehnhar*" which includes last names like Lehnhard, Lehnhart, Lehnhardt etc. Further, the search criterion may comprise a number of hits k "top k", i.e. the number of data items which are at most to be returned as a response to the request. Further, with this kind of request a search direction is also given: the search direction is ascending.

The reason is the following: in order to ease the handling of retrieval of patient records, at the reception desk of the medical office the secretary may wish to type a patient's last name without knowing in detail how the name is spelled. Thus, instead of querying the database for the exact name "Lehnhardt", the secretary may decide to search for "Lehnhar*".

It has to be noted here that the encrypted first data items $c\_aij$ stored in each relation T1, T2, Tn are encrypted with the cryptographic key K in the first relations. Further, the first data items form a partially ordered set in each first relation. In each first relation the partial order is formed with respect to the first data items of said first relation in non-encrypted form. This means, that in the example of FIG. 1 in each first relation the encrypted data items are lexicographically sorted. For example $a11<a12<a13<a14$, $a21<a22<a23 \ldots$. This sorting is reflected in each first relation by providing each $c\_aij$ with respective order information.

In this example, the order in which the encrypted first data items are stored in said first relations is ascending. However, a different order is also possible. Thus, the search for the top k elements satisfying the query "Lehnhar*" should result in an ordered set of elements which comprise the first k data items matching the query. The top k elements have to be retrieved from all available relations T1, T2, . . . , Tn.

Since the client computer 10 and the server 22 are used for handling of medical data records, it is crucial that any information leaving the client and thus the environment of the medical office is kept confidential. It has to be ensured that no unauthorized person may ever have access to the patient data records. This includes the administrator of the database 30 at the server 22. Therefore, any data communicated over the network 48 must be encrypted. The same holds for any data stored in the data-base 30.

Figure 2:
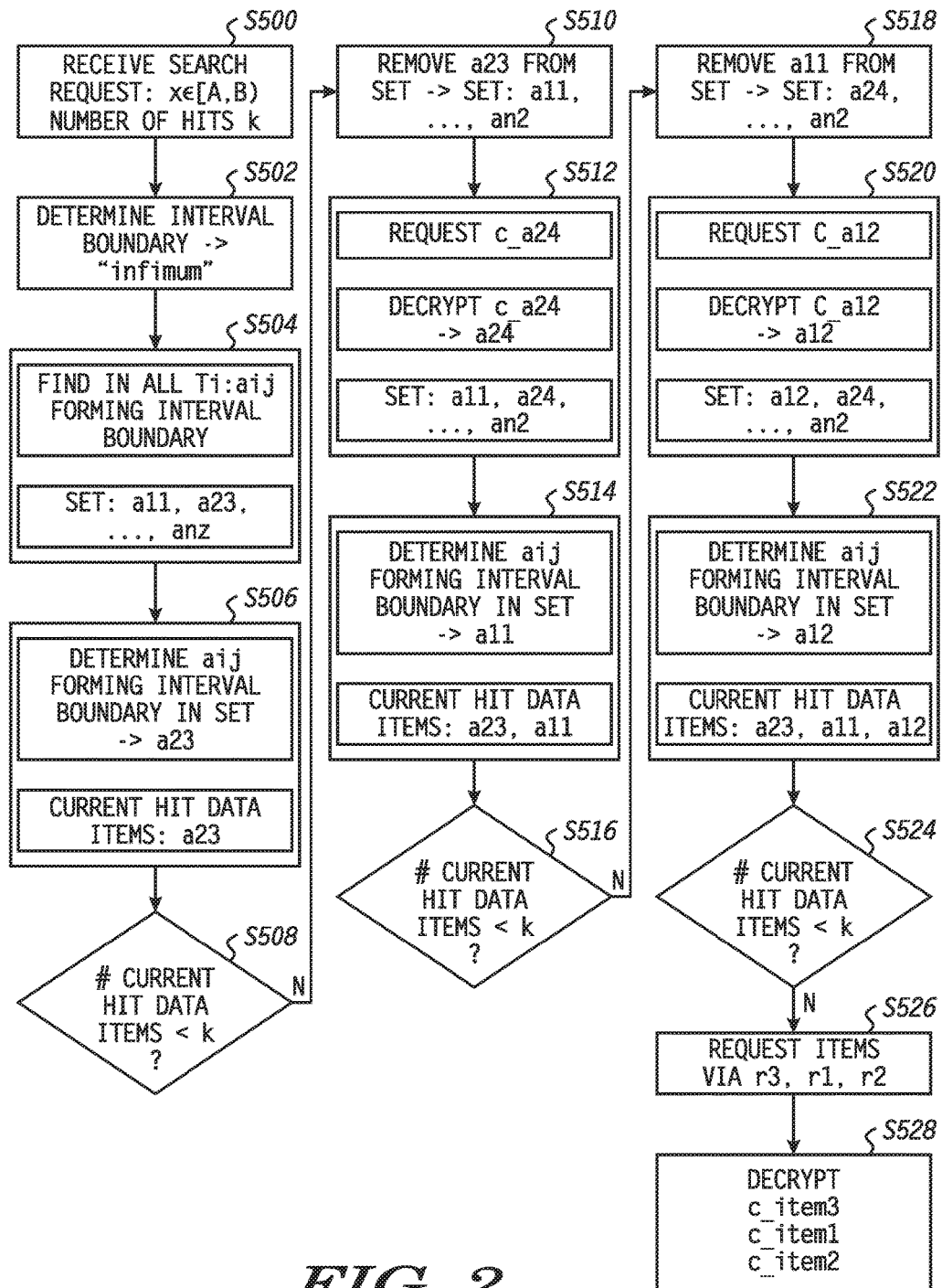
FIG. 2 is a flow chart illustrating steps of querying a data-base.

In order to nevertheless permit performing a fast search with the search criterion 19, the following procedure is performed, which is explained in an exemplary manner with respect to the flow chart of FIG. 2:

After receiving (S500) the search criterion 19 as a prefix search "Lehnhar*", the application 17 identifies a search interval from said criterion. The interval is given by [Lehnhar, Lehnhas). In step S502 the infimum (see above definition) is declared as the relevant interval boundary. Subsequent step 504 is only depicted schematically, in which for each first relation T1 . . . Tn the data item has to be identified which forms in each first relation the interval boundary, i.e. the infimum. In the example of FIG. 1, the infimum of relation T1 is given by the data item a11, the infimum of relation T2 is given by the data item a23 and the infimum of relation Tn is given by the data item an2. For the sake of simplicity further relations T3, T4 are omitted from the discussion. Nevertheless a skilled person will understand how the usage of additional first relations will influence the present principal discussion.

This results in a set of current decrypted first data items a11, a23, . . . , an2. From this set, the current hit data item is determined (S506) which forms the interval boundary, i.e. the infimum of this set. Here it is assumed that this is the data item a23. Thus, a so called "hit data item" is given by the data item a23. In the above example, data item a23 may be the data item "Lehnhard".

In step S508 it is determined if the total number of hit data items is smaller than k. For example k is 3. Since up to now only 1 hit data item was identified, the method continues with step S510, in which the data item a23 is removed from the set of current decrypted first data items a11, a23, . . . , an2. Further, in step S512 a new encrypted first data item is requested from the relation T2, wherein the request for the new encrypted first data item comprises information that the new encrypted first data item is to be retrieved from the first relation T2 at a position in the partial order immediately succeeding the position of the data item a23. Thus, c_a24 is requested, decrypted and added to the set of current decrypted first data items. This results in a new set a11, a24, . . . , an2.

Now step S514 is performed which is similar to step S506 besides the fact that as infimum for example data item a11 is identified. Thus, another so called "hit data item" is given by the data item a11. In the above example, data item a11 may be the data item "Lehnhardd".

In step S516 it is determined if the total number of hit data items is smaller than k. Since up to now only 2 hit data items were identified, the method continues with step S518, in which the data item a11 is removed from the set of current decrypted first data items a11, a24, . . . , an2. Further, in step S520 a new encrypted first data item is requested from the relation T1, wherein the request for the new encrypted first data item comprises information that the new encrypted first data item is to be retrieved from the first relation T1 at a position in the partial order immediately succeeding the position of the data item a11. Thus, c_a12 is requested, decrypted and added to the set of current decrypted first data items. This results in a new set a12, a24, . . . , an2.

Now step S522 is performed which again is similar to step S506 besides the fact that as infimum for example data item a12 is identified. Thus, another so called "hit data item" is given by the data item a12. In the above example, data item a12 may be the data item "Lehnhardt".

In step S524 it is determined if the total number of hit data items is smaller than k. Since up to now already 3 hit data items were identified, this is not the case (k=3). Thus, the method continues with step S526. Here, the second data items assigned via the referential connections r3, r1 and r2 to the respective first data items a23, a11 and a12 are requested from the second relation U. The database will provide the requested second data items c_item3, c_item1 and c_item2. Finally, in step S528 these second data items are decrypted using the key K. It has to be noted that it is in the nature of this described procedure that the requested second data items are provided readily sorted in exact this order. Thus, sorting is automatically done using the content of the first relations.

As a result, at the client 10 the secretary searching for the top 3 hits of "Lehnhar*" will obtain three results "Lehnhard" (together with the information content like a medical record for patient Lehnhard comprised in item3), "Lehnhardd" (together with the information content like a medical record for patient Lehnardd comprised in item1) and "Lehnhardt" (together with the information content like a medical record for patient Lehnardt comprised in item2).

Figure 3:
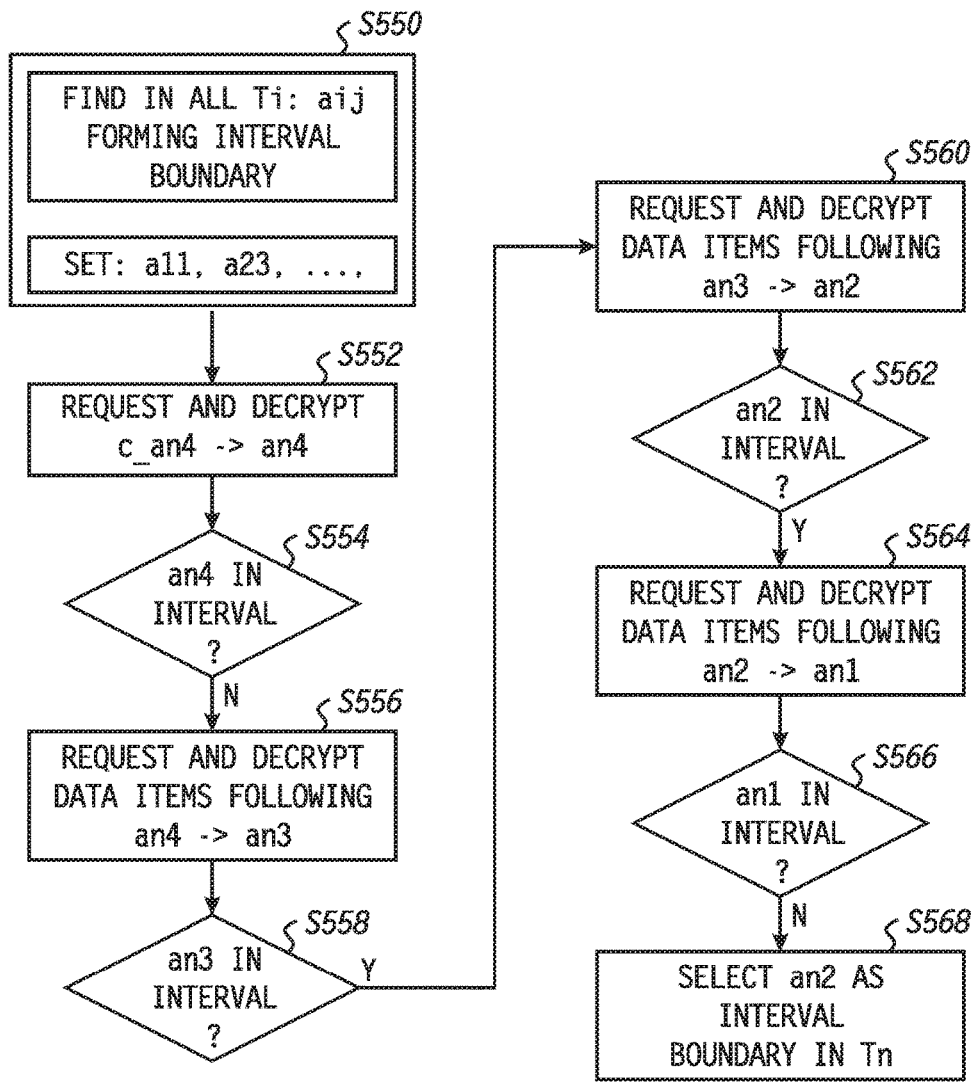
FIG. 3 is a flow chart illustrating steps of selecting interval boundaries.

For a better understanding how in step S504 the aij forming the interval boundary are determined, reference is made to FIG. 3:

Assuming that in step S550 the first data items a11, a23, . . . forming the interval boundaries in the first relations T1, T2, . . . have been identified, the method continues with step S552 in order to determine the first data item forming the interval boundary in the relation Tn. For this reason, in S552 the client may request for example an arbitrary data item from the relation Tn. In case in the first relation Tn the first data items form a partial ordered set via a rooted tree, as a first data item in step S552 the data item at the root of the tree is requested. This results in a data item c_an4, which is decrypted using the key K for obtaining the current decrypted first data item an4.

In step S554 it is determined if an4 is lying in the search interval [Lehnhar,Lehnhas). For explanatory purposes only it is assumed that an4 is given by the name "Leihner". Thus, an4 is not lying in the search interval. As a consequence step S556 requests a new encrypted first data item. The request comprises information that the new encrypted first data item is to be retrieved from Tn at a position in the partial order preceding the position of the current encrypted first data item an4, since the interval boundary is preceding the current decrypted first data item with respect to the partial order. In response to said provision of the request for the new encrypted first data item, the new encrypted first data item c_an3 is received and decrypted.

In step S558 it is determined if an3 is lying in the search interval [Lehnhar,Lehnhas). For explanatory purposes only it is assumed that an3 is given by the name "Lehnharv". Thus, an3 is lying in the interval. As a consequence, in step S560 another request for a new encrypted first data item is provided to the data-base, wherein the request for the new encrypted first data item comprises information that the new encrypted first data item is to be retrieved from a position in the partial order again preceding the position of the current encrypted first data item an3, since the interval boundary is preceding the current decrypted first data item an3 with respect to the partial order. In response to said provision of the request for the new encrypted first data item, the new encrypted first data item c_an2 is received and decrypted.

In step S562 it is determined if an2 is lying in the search interval [Lehnhar,Lehnhas). For explanatory purposes only it is assumed that an2 is given by the name "Lehnhart". Thus, an2 is lying in the interval. As a consequence, in step S564 another request for a new encrypted first data item is provided to the data-base, wherein the request for the new encrypted first data item comprises information that the new encrypted first data item is to be retrieved from a position in the partial order again preceding the position of the current encrypted first data item an2, since the interval boundary is preceding the current decrypted first data item an2 with respect to the partial order. In response to said provision of the request for the new encrypted first data item, the new encrypted first data item $c\_an1$ is received and decrypted.

In step S562 it is determined if an1 is lying in the search interval [Lehnhar,Lehnhas). For explanatory purposes only it is assumed that an1 is given by the name "Lehnhand". Thus, an2 is not lying any more in the interval. As a consequence in step S568 it is determined that an2 is to be selected as the data item forming the interval boundary in the relation Tn.

A cloud computing environment is service oriented with a focus on statelessness, low coupling, modularity, and semantic interoperability. At the heart of cloud computing is an infrastructure comprising a network of interconnected nodes. Referring now to FIG. 4, a schematic of an example of a cloud computing node is shown. Cloud computing node 1010 is only one example of a suitable cloud computing node and is not intended to suggest any limitation as to the scope of use or functionality of embodiments of the invention described herein. Regardless, cloud computing node 1010 is capable of being implemented and/or performing any of the functionality set forth hereinabove. Thus node 1010 may be client 10 or the server 22. Further, multiple nodes may be present.

In cloud computing node 1010 there is a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 1012 in cloud computing node 1010 is shown in the form of a general-purpose computing device. The components of computer system/server 1012 may include, but are not limited to, one or more processors or processing units 1016, a system memory 1028, and a bus 1018 that couples various system components including system memory 1028 to processor 1016. Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1012 typically includes a variety of computer system readable media. Such media may be any available media that is accessible by computer system/server 1012, and it includes both volatile and non-volatile media, removable and non-removable media.

System memory 1028 can include computer system readable media in the form of volatile memory, such as random access memory (RAM) 1030 and/or cache memory 1032. Computer system/server 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions of embodiments of the invention.

Program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system/server 1012 may also communicate with one or more external devices 1014 such as a keyboard, a pointing device, a display 1024, etc.; one or more devices that enable a user to interact with computer system/server 1012; and/or any devices (e.g., network card, modem, etc.) that enable computer system/server 1012 to communicate with one or more other computing devices. Such communication can occur via Input/Output (I/O) interfaces 1022. Still yet, computer system/server 12 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, tape drives, and data archival storage systems, etc.

Referring now to FIG. 5, illustrative cloud computing environment 1050 is depicted. As shown, cloud computing environment 1050 comprises one or more cloud computing nodes 1010 with which local computing devices used by cloud consumers, such as, for example, personal digital assistant (PDA) or cellular telephone 1054A, desktop computer 1054B and/or laptop computer 1054C. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 5 are intended to be illustrative only and that computing nodes 1010 and cloud computing environment 1050 can communicate with any type of computerized device over any type of network and/or network addressable connection (e.g., using a web browser).

FIG. 6 shows a computer system 100 that comprises multiple sets of client computers, i.e. a number I of sets S1, S2, ... Si, ... SI-1, SI. Each one of the sets Si is located in a respective trusted environment 102 that is in some way access restricted. For example, the set S1 of client computers is located within trusted environment 102.1, set S2 of client computers in trusted environment 102.2, ... set Si of client computers in trusted environment 102.i etc. such that there is a one-to-one relationship between sets Si of client computers and trusted environments 102.i. Alternatively at least one, some or all of the client computers are located outside a trusted environment, such as in a vehicle.

One of the trusted environments 102.i may be a medical practice or another enclosed area in a building, with restricted access. For example access into one of the trusted environments 102.i can be restricted by means of an electronic access control system and/or physical and/or organizational measures.

In the following the set Si of client computers is considered by way of example only and without restriction of generality: The set Si has a number of J client computers Ci1, Ci2, ... Cij, ... CiJ. On each one of the client computers Cij an application program 104 is installed that has a configuration file 106 storing client computer specific database log-in information Lij.

The database log-in information Lij of a given client computer Cij can be constituted by a 'username'/password combination or other authentication information. It is important to note that the 'username'/password combination or other authentication information is not assigned to an actual user but to the respective client computer Cij on which the application program 104 with the log-in information Lij is installed. Hence, 'username' does not refer to a user but to a specific client computer Cij.

The same applies analogously to the other sets of client computers where the number J of client computers per set can vary.

A group of a number K of authorized users Ui1, Ui2, Uik, ... UiK has access to the trusted environment 102.i, where the number of authorized users K can be below, equal or greater than the number of client computers J. Each client computer Cij of the set Si is set up such that any one of that group of authorized users which are authorized with respect to the trusted environment 102.i can utilize any one of these client computers of set Si.

Each one of the authorized users Uik has an assigned security token STik, such as a chip card. Each one of the security tokens STik has a memory for storing a cryptographic key 108 and a key identifier 110 of the cryptographic key 108.

The key 108 of security token STik may be specific to the user Uik to which the security token STik is assigned such that all authorized users across all trusted environments 102 have different cryptographic keys 108. Alternatively, the cryptographic keys 108 are user-group specific. For example, a user-group is constituted by all users Ui1 to UiK of the trusted environment 102.i such that all authorized users of that trusted environment 102.i share the same cryptographic key 108. Alternatively, one or more sub-groups of users of the group of authorized users of one of the trusted environments 102.i can be defined such that users of that sub-group share identical cryptographic keys 108.

The key identifier 110 can be a globally unique identifier (GUID) of the cryptographic key 108 such that any of the cryptographic keys 108 is unequivocally identified by its respective key identifier 110.

Each one of the sets of client computers is coupled to a database system 112 via a network 114, such as the internet. The database system comprises a number of I databases DB1, DB2, ... , DBi, ... , DBI-1, ... , DBI. Each one of the databases may be a relational database comprising database tables 116. Each one of the databases is assigned to one of the sets of client computers such that there is a one-to-one relationship between databases and sets of client computers. In other words, the set Si of client computers is assigned to the database DBi.

By way of example one of the database tables 116 of the database DBi is shown in a schematic way:

| Encrypted data item | key identifier |
|---|---|
| c | GUID (key) |
| ... | ... | where c is an encrypted data item, i.e. a cipher text that has been obtained by encryption of the data item using the cryptographic key 108 that is identified by the GUID stored as an attribute of c in the database table 116. The database table 116 may be split into separate relational database tables depending on the implementation.

It is important to note that the key 108 itself is not stored anywhere in the database system 112 and that the database tables 116 merely comprise cipher text, key identifiers and digital signatures, depending on the implementation. Hence, confidentiality of the data that is stored in the database tables 116 of the database system 112 does not need to be ensured as all data items are stored in encrypted form and the key identifiers and digital signatures are stored as attributes of the cipher text but not the keys themselves.

The database system 112 has a log-in component 118 that serves for logging in the various client computers of the sets of client computers. The log-in component 118 has access to assignment information 120 that is stored in the database system 112. The assignment information 120 may be stored in tabular form using the log-in information Lij of the configuration files 106 for specifying the assignments of the sets of client computers to the databases. For example, the assignment information 120 may be stored in the following tabular form:

| Client specific log-in information | database |
|---|---|
| Lij | i |
| ... | ... |

In other words, each log-in information Lij is assigned to one of the databases DBi that is identified by its index i in the tabular assignment information 120. The assignment information 120 may be split into separate relational database tables depending on the implementation.

Without restriction of generality and by way of example the user Uik is considered in the following:

The user Uik enters the trusted environment 102.i. If the trusted environment 102.i has an electronic access control system the user Uik may utilize its security token STik for obtaining access to the trusted environment 102.i through the electronic access control system, such as by inserting the security token STik or bringing the security token STik into the proximity of a chip card reader of the electronic access control system.

The user Uik may then select any one of the client computers of the set Si, such as client computer Cij. Depending on the implementation, the client computer Cij may have a log-in component for logging in the user Uik.

In response to a respective command entered by the user Uik into client computer Cij the application program 104 establishes a network session, such as an internet session 122 with the database system 112. The application program 104 reads the log-in information Lij from its configuration file 106 and sends the log-in information Lij via the internet session 122 to the database system 112 where it is received by the log-in component 118.

The log-in component 118 searches the assignment information for a matching log-in information. If such a matching log-in information can be identified the respective assignment of the matching log-in information Lij to one of the databases DBi is read from the assignment information 120 and a database connection is established between that database DBi and the application program 104 of the client computer Cij.

The application program 104 reads the key 108 and the key identifier 110 from the security token STik of the user Uik and stores this information temporarily. This may require unlocking the security token STik by authentication of the user Uik against the security token STik, such as by entry of a PIN.

The user Uik may then enter the search criterion into the application program 104 of the client computer Cij, such as an unencrypted data item for which matching records that are stored in the database system 112 are to be retrieved. Upon entry of the data item the application program 104 encrypts the data item using the key 108. The application program 104 then generates a database query 124 that contains the encrypted data item as a search criterion and the key identifier 110 of the cryptographic key 108 as an additional search criterion in order to limit the search to such encrypted data items that have a matching key identifier attribute.

This database query 124 is transmitted via the database connection established over the internet session 122 to the database DBi that has been identified by the log-in component 118 as the database that is assigned to the set Si. The database DBi executes a search for data records that have encrypted data items that match the encrypted data item and which in addition have a matching key identifier, i.e. a matching GUID, for processing of the query 124. This limits the search results to data items that have been encrypted by the key 108.

These search results 126 are returned from the database DBi to the application program 104 of the client computer Cij. The application program 104 decrypts the encrypted data items contained in result 126 by means of the key 108 and outputs the decrypted data items such as on a display of the client computer Cij.

For storing a data item in the database system 112 a database connection is established as described above. The user Uik enters a data item to be stored into the application program 104 which encrypts the data item using the key 108 and generates a database insert command for writing the encrypted data item with the key identifier 110 as an attribute to the database DBi.

FIG. 7 shows a block diagram of a further embodiment of the invention. By way of example and without restriction of generality an arbitrary security token STik of a user Uik that has selected client computer Cij is shown in FIG. 7 whereby the other security tokens and client computers of the computer system 100 can be structurally identical or similar. However, it may be noted that the cryptographic key 108 may be obtained by any suitable means. For example, the cryptographic key 108 may be entered manually by a user into the application program 104 or the key 108 may be generated by the application program 104 using a user name and password of the user.

The security token STik has an electronic memory 128 for storing the cryptographic key 108 and the key identifier 110. Further, a private key 130 that belongs to an asymmetric cryptographic key pair assigned to the user Uik and the security token STik is stored in a secure storage area of the memory 128. A corresponding certificate 132 that contains the respective public key of the asymmetric cryptographic key pair may also be stored in the memory 128 or elsewhere.

The certificate 132 is a public key certificate that is also known as digital certificate that may be signed by a certificate authority within a public key infrastructure scheme. The certificate 132 may comply with any respective standard, such as X.509.

Further, authentication information 134 may be stored within a secure storage location of the memory 128, such as a personal identification number (PIN). Correct entry of the authentication information 134 into the security token STik may be required for unlocking the security token STik.

The security token STik has a processor 136 for execution of program modules 138 and 140. Further, the security token STik has a communication interface 142.

The program module 140 serves for authentication of the user Uik. For authentication the user Uik enters authentication information, such as a PIN, that the security token STik receives at its interface 142. By execution of the program module 140 the validity of the authentication information entered by the user Uik is checked by comparing it to the authentication information 134 that is stored in the memory 128. If the entered authentication information matches the authentication information 134 an authentication signal is generated by the program module 140 for unlocking the security token STik. This enables to read out the cryptographic key 108 and the key identifier 110 via the interface 142 and to request the generation of an electronic signature by execution of the program module 138 that uses the private key 130 for generating an electronic signature by the application program 104.

The client computer Cij has a communication interface 144 that is interoperable with the interface 142 of the security token STik. For example, the interfaces 142 and 144 are chip card interfaces or RF interfaces that comply with an RFID and/or NFC communication standard.

The client computer Cij has a processor 146 for execution of a program module 148 that may be part of the operating system and for execution of the application program 104 (cf. FIG. 6).

The program module 148 implements a log-in component that serves for logging in and logging out a user with respect to the client computer Cij. A user log-in may be performed by entering a username/password combination into the client computer Cij and matching that entered username/password combination with a respective authentication data 150 that contains the same username/password combination and which is stored in non-volatile memory 152 of the client computer Cij. Log-out may be performed automatically by the program module 148 when a timeout condition of extended user inaction is fulfilled.

The application program 104 comprises a program module 154 for authentication of the application program 104 and the client computer Cij on which it is installed vis-à-vis the database system 112. For that purpose the program module 154 is interoperable with the log-in component 118.

The application program 104 further comprises a program module 156 for encryption of a data item by means of the key 108 and a program module 158 for decryption of an encrypted data item using the key 108. The client computer Cij has a working volatile memory 160 for storing a copy of the cryptographic key 108 and its key identifier 110. A configuration file 106, such as an INI file, that contains the client computer specific log-in information required by the log-in component 118 is stored in the non-volatile memory 152.

Further, the client computer Cij has a network interface 164 for coupling the client computer Cij to the database system 112 via the network 114.

In operation the user logs into client computer Cij by entry of his or her username/password combination which is checked against the authentication data 150 stored in the memory 152 by the program module 148. If the entered username/password combination of the user Uik matches the authentication data 150 the user Uik is successfully logged into the client computer Cij. Execution of the application program 104 is started. This can be implemented by the standard Windows log-in if an Windows operating system is utilized on the client computer.

Next, the application program 104 prompts the user Uik to present his or her security token STik at the interface 144 such as by inserting the security token STik into a chip card reader of the client computer Cij. Next, the user Uik needs to authenticate vis-à-vis the security token STik for unlocking the security token. This is done by entry of the user's PIN into the security token STik either via the client computer Cij, via the chip card reader or directly into the security token STik depending on the implementation.

When the security token STik is unlocked the application program 104 generates a read command that is communicated via the interfaces 144 and 142 such as in the form of a command APDU for reading out the cryptographic key 108 and its key identifier 110. Copies of the key 108 and the key identifier 110 are then stored in the memory 160 by the application program 104.

Further, the application program 104 initiates the establishment of a database connection with the database system 112 by establishing the internet session 122, reading of the configuration file 106 that contains the client computer specific log-in information Lij by the program module 154 and sending the client computer specific log-in information Lij to the log-in component 118.

The log-in component 118 determines the database to which the set Si of client computers to which the client computer Cij belongs is assigned using the assignment information, i.e. by determining i from the tabular assignment information 120 by means of the log-in information Lij contained in the configuration file 106 (cf. FIG. 6).

The database connection is then established between the application program 104 and the determined database, i.e. the database DBi, provided that the log-in information Lij is correct.

For retrieval of a data item or a data record that contains that data item the following steps are executed:

The user Uik enters the data item as a search criterion into the application program 104.

The application program 104 reads the key 108 from memory 160 and executes the program module 156 for encryption of the data item with the key 108 which provides the cipher text c.

The application program 104 reads the key identifier 110 from the memory 160.

The application program 104 generates a database query, such as an SQL query, containing the cipher text c and the key identifier 110 as search criteria and sends the database query via the database connection that has been established over the internet session 122 to the database DBi.

The database DBi executes the database query by searching for matching data records that contain the cipher text c and the key identifier 110. The database DBi then returns matching data items via the database connection to the application program 104.

The application program 104 decrypts the returned data items by execution of the program module 158 using the cryptographic key 108 for decryption. If the data record contains a digital signature the validity of the digital signature is checked by the application program 104. The decrypted data records may then be displayed on a display of the client computer Cij. If the signature is invalid an error signal may be outputted.

For writing data to the database system 112 the following steps are performed after the database connection has been established:

The user Uik enters at least one data item or a complete data record that contains this data item in one of its data fields into the application program 104.

The application program 104 generates a command for generating a digital signature for the entered data item or data record which is sent via the interface 144 to the security token STik. For example, the application program 104 generates a hash value for the data item or the data record which is sent to the security token STik via the interface 144 for generating the signature by program module 138 using the private key 130.

The application program 104 reads the cryptographic key 108 from the memory 160.

The application program 104 encrypts the data item and other data contained in data fields of the data record, if any, by execution of the program module 156 using the cryptographic key 108.

The application program 104 reads the key identifier 110 from the memory 160.

The application program 104 generates a database insert command for writing the encrypted data item in conjunction with the key identifier 110 as an attribute and together with the digital signature to the database DBi. The database insert command is transmitted from the application program 104 via the database connection and executed by the database DBi. The database DBi returns an acknowledgement to the application program 104 after completion of the database insert operation.

It is important to note that in this example the database DBi does not check the validity of the signature that it receives with the database insert command. Checking of the signature only occurs after retrieval of the encrypted data item or data record from the database DBi in the client domain, e.g. by client computer Cij, in the embodiment considered here. However, in an embodiment the encrypted data item may be signed by the application program 104 which provides an alternative or additional digital signature which is transmitted to the database. In this case, the database may be able to directly verify the resulting signature of the encrypted data item.

FIG. 8 shows a flowchart of an embodiment of a method for retrieval of data from the database system 112.

In step 200 one of the users Uik that is an authorized user of the set Si of client computers that are within the trusted environment 102.i selects one of the client computers Cij of that set Si. In step 202 the user Uik logs into that client computer by entering user specific log-in information, such as his or her username/password or biometric information.

After successful log-in into client computer Cij the application program 104 is started in step 204. In step 206 the user Uik authenticates against his or her security token STik such as by entering his or her PIN. After successful authentication the security token STik is unlocked and the application program 104 can perform a read access onto the security token STik in step 208 for reading the cryptographic key 108 and its key identifier 110. The application program 104 stores copies of the cryptographic key 108 and the key identifier 110 in the working memory 160 of the client computer Cij.

The application program 104 reads the client computer specific log-in information Lij from its configuration file 106, such as its INI file (step 209). In step 210 the internet session 122 is established between the application program 104 and the database system 112 and transmits that log-in information Lij via the internet session 122 to the database system 112, namely its log-in component 118, in step 214.

The log-in component 118 uses the log-in information Lij for retrieval of the assignment of the client computer Cij from the assignment information 120 in step 216 in order to determine the database DBi to which the client computer Cij is assigned. The database connection is then established between that database DBi and the application program 104 over the internet session 122 if the database login operation has been successful.

For retrieval of a data item the user enters an unencrypted search term into the application program 104 in step 218. That search term is encrypted using the cryptographic key 108 in step 220 and a database query is generated in step 222 that contains the encrypted search term and in addition the unencrypted key identifier as an additional search criterion.

That database query is communicated to the database DBi via the database connection and processed by the database DBi in step 224. In response to the database query the database may return one or more encrypted hits to the application program 104, i.e. one or more data items that contain the encrypted search term, in step 226. In step 228 the returned search results are decrypted by the application program 104 using the cryptographic key 108 and the result of the decryption is displayed on a user interface in step 230. A digital signature that may also be returned by the database DBi is checked for validity. This may be a precondition for displaying the hit.

In step 232 a log-off condition is fulfilled, such that the user Uik is logged off from the client computer Cij. Such a user log-off may occur after an extended period of user inactivity. As a consequence of the user log-off at least the key 108 is erased from the memory 160 of the client computer Cij in step 234.

FIG. 9 shows a method for writing data to the database system 112.

First, a database connection is established by execution of the steps 200-216 in the same or analogous way as described above with respect to the embodiment of FIG. 8.

Next, the user enters at least one data item in step 318 into the application program 104. The application program 104 encrypts the at least one data item in step 320 using the cryptographic key 108 and generates a database insert command in step 322. The database insert command comprises the at least one encrypted data item and the unencrypted key identifier 110 of the cryptographic key 108 with which the at least one data item has been encrypted; the database insert command can also comprise a digital signature.

The database insert command is communicated via the database connection to the database DBi which processes the database insert command in step 324. After the at least one encrypted data item has been written to the database table 116 of the database DBi together with the unencrypted key identifier and with a digital signature of the at least one data item, the database DBi returns an acknowledgement to the application program 104 in step 326.

Steps 328 and 330 are analogous to steps 232 and 234 of the FIG. 8 embodiment. In other words, when user log-off occurs at least the key 108 is automatically erased from the memory 160 without retaining a copy of that key 108 by the client computer Cij.

FIG. 10 depicts a flowchart in which in a more generalized manner the steps for querying the database (compare FIG. 2) are described. The method starts in step S600 in which a search request is received at the client, said search request specifying a search interval, a number of maximum total hits and a search direction. In step S602 the infimum is declared as the interval boundary in case the search direction is ascending with respect to the order in which the encrypted first data items are stored in the first relations or the supremum is declared as the interval boundary in case the search direction is descending with respect to the order in which the encrypted first data items are stored in the first relations T1, T2, . . . , Tn.

The box around the subsequent steps S604, S606, S608 and S610 indicates that these steps are only depicted schematically. A more detailed explanation of the procedure performed in said box is given by the flowchart in FIG. 11 (to be discussed below).

Steps S604, S606, S608 and S610 are performed for each first relation T1 (i=1 . . . n): in step S604 an encrypted current first data item is requested from the relation T1. As a response the database provides in step S606 said requested encrypted current first data item $c\_aij$. The client is decrypting $c\_aij$ in step S608 which results in a decrypted current first data item aij. In step S610 it is determined if aij is forming the interval boundary. If this is not the case, the method returns to step S604. In case aij is forming the interval boundary, the method continues with step S612.

In step S612 the data item aij is stored in a set, called "set of current decrypted first data items". These data items form the interval boundaries in each first relation T1. In the subsequent step S614, as a current hit data item the decrypted current first data item is selected from the set of current decrypted first data items which forms the interval boundary with respect to the set of current decrypted first data items and which is lying in the interval. This results in step S616 in a current hit data item.

In step S618 the current hit data item is removed from the set of current decrypted first data items. In subsequent step S620 the client determines if the total number of selected current hit data items is below the number of maximum total hits.

If this is the case, the method continues with step S622 with providing a request for a new encrypted first data item to the database, wherein the request for the new encrypted first data item comprises information that the new encrypted first data item is to be retrieved from the first relation comprising the current encrypted first data item corresponding to the current hit data item at a position in the partial order immediately preceding or succeeding the position of the current encrypted first data item corresponding to the current hit data item, depending if the interval boundary is the supremum or the infimum. In step S624 said request is received by the database and the database provides in S624 a new encrypted first data item c_aij. For example in case the current hit data item originated from relation T2, the request for the new encrypted first data item is also directed to relation T2.

In step S626 the new encrypted first data item c_aij is decrypted for obtaining a new decrypted first data item aij as the current decrypted first data item. In step S612 said current decrypted first data item aij is added to the already existing set of current decrypted first data items. Then steps S614-S620 are repeated.

It has to be noted that in step S612 the current decrypted first data item aij is preferably only added to the set of current decrypted first data items in case the current decrypted first data item is lying within the interval.

In subsequent step S620 the client determines again if the total number of selected current hit data items is below the number of maximum total hits. If this is not the case, the method continues with step S628 in which for each selected current hit data item information content is requested from the database. Here it is assumed that information content is stored in a second relation, wherein a referential connection exists assigning each encrypted first data item to at least one of the second data items stored encrypted in the second relation. The method ends in step S630.

It has to be noted that in FIG. 10 only steps S606 and S624 are performed at the database, whereas all other steps are exclusively performed at the client. At no time the database is obtaining any information on the decrypted content of the data items c_aij.

In FIG. 11 the procedure how to determine the data items forming the interval boundaries in each first relation is described in more detail. In step S650 a first relation is selected for which the data item forming the interval boundary is to be determined. The client requests in step S652 a encrypted current first data item from the database. The request is received at the database (S654) and the requested current first data item c_aij is provided to the client (S656).

After receiving c_aij (S658) the client decrypts c_aij (S660) in order to obtain aij, i.e. the decrypted current first data item.

Then the client determines if the current decrypted first data item lies within the search interval (S662). If this is not the case, i.e. in case the current decrypted first data item lies outside the search interval, a request for a new encrypted first data item is provided to the database (S664), wherein the request for the new encrypted first data item comprises information that the new encrypted first data item is to be retrieved from a position in the partial order preceding or succeeding the position of the current encrypted first data item, depending if the interval boundary is preceding or succeeding the current decrypted first data item with respect to the partial order. The request is received at the database (S668) and in response the new requested encrypted first data item c_aij is provided by the database to the client (S656). The method continues with steps S658 and S660, i.e. receiving and decrypting the new encrypted first data item.

In case in step S662 it is determined that the current decrypted first data item lies inside the search interval, a request for a new encrypted first data item is provided by the client to the server (S666), wherein the request for the new encrypted first data item comprises information that the new encrypted first data item is to be retrieved from a position in the partial order preceding or succeeding the position of the current encrypted first data item, depending if the interval boundary is preceding or succeeding the current decrypted first data item with respect to the partial order. The request is received at the database (S672).

In step S674 the database determines if a subsequent encrypted first data item is available at the indicated position. This might not be the case if the current decrypted first data item is for example a leaf element (here it shall be assumed that in the first relation the first data items form a partial ordered set in said first relation via a rooted tree).

In case in step S674 a subsequent encrypted first data item is available at the indicated position, the database will provide a new encrypted first data item c_aij (S676), which is then received and decrypted by the client (S678) for obtaining aij. In step S680 it is determined if the new decrypted first data item aij is lying in the search interval.

In case the new decrypted first data item lies outside search interval, this indicates that step S666 'overshooted' the data item forming the interval boundary. Thus, the current decrypted first data item, i.e. the data item which was previously determined as lying in the search interval in step S662, is determined as the data item forming the interval boundary of the search interval (S682). Then the method continues with selecting the next relation for which the data item forming the interval boundary has to be determined (S684 and subsequent step S652).

In case in step S680 the new decrypted first data item lies within the search interval, the method continues with previously discussed step S666. This is because of non-overshooting the interval boundary the method (steps S666 ff.) has to be repeated at least one more time.

In case in step S674 a subsequent new data item is not available, the data item determined in S666 must form the interval boundary. Thus, in this case the method continues with discussed step S682.

It has to be noted that in the loop of steps S660-S670 it may turn out that the relation does not comprise any data item lying in the interval. In this case no data item forming the interval boundary can be provided and the method directly continues with step S684.

In FIG. 11 it was assumed that for each new c_aij required by the client, the client provides a request to the database for providing the c_aij. In systems in which the client is connected to the database via a network with high latency times this may lead to an unwanted thwarting of the system.

FIG. 12 provides a solution for this scenario. In the following description identical steps of FIG. 11 and FIG. 12 are given in parenthesis.

After selecting a first relation for determining the data item forming the interval boundary (S650, S700), a request for multiple encrypted first data items is provided to the database (S652, S702). Compared to step S652, multiple first data items are requested at the same time, wherein said multiple first data items are provided in contiguous form as given by the partial order in said selected first relation. The request is received at the database (S654, S704), provided to the client (S656, S706), received and decrypted at the client (S658, S708).

The result of S708 is a set with multiple first data items. This set is stored in a memory assigned to the client. This is for example the cache 24 or a RAM memory 14 of the client 10 in FIG. 1. In step S710 one data item of the set of data items is selected by the client and decrypted (S660, S712). Step S714 is identical with S662.

In case in subsequent step S716 (S664) a new c_aij following the previous c_aij is requested, the difference between S716 and S664 is that in S716 the client attempts to obtain the new c_aij from the set of c_aij that was generated in step S708. In contrast, in FIG. 11 the client again contacts the database for obtaining the new c_aij (steps S666-S676).

In step S718 the client determines if the requested new c_aij is available in the set of c_aij. If this is the case, no further communication with the database is necessary and the method continues with step S710. Contrary in case the requested new c_aij is unavailable in the set of c_aij, the method jumps back to S702 with requesting a new set of multiple data items from the data-base.

In case step S714 (S662) returns that aij is lying in the search interval, the method continues with steps S720ff (S666ff). It has to be noted that steps S720ff are only depicted schematically without providing details. For performing S720ff, the same principles should be applied as discussed with respect to S702ff. This means that with step S720 the available set of c_aij should be checked for availability of the requested new c_aij.

FIG. 13 shows a flowchart illustrating a method of updating a first relation like for example the first relation T1 (36) of FIG. 1. Similarly as for querying the data-base, when updating the database it has to be ensured that at no time the database receives any unencrypted information which would permit a conclusion of the first data items to be stored. Nevertheless, when storing the first data items the first data items have to form a partially ordered set in the first relation.

For the following discussion it is assumed without restriction to generality that in the relation T1 to be updated the first data items form a linear ordered set in the first relation, the linear order being formed with respect to the first data items in non-encrypted form.

The method starts in step S750 in which the client requests any arbitrary current first data item from the data-base. In this request the relation is specified. For example, relation T1 is specified (compare FIG. 1). In case of a linear order, the current first data item may be the first or the last data item of the linear order. Preferably, the current first data item is the data item located in the middle of all data items with respect to the linear order.

The request is received by the database in step S752 and in response to said requesting of the current encrypted first data item, in step S754 the database provides the data item to the client. In step S756 the current encrypted first data item is received and decrypted by the client using the key K. For example, data item a13 is obtained. Now, the client will compare the current decrypted first data item a13 with the "update first data item" to be stored in the database. Depending if the update first data item is preceding or succeeding the current decrypted first data item with respect to the partial order, in step S758 the request for the next new encrypted first data item comprises information that the new encrypted first data item is to be retrieved from a position in the partial order preceding or succeeding the position of the current encrypted first data item. This request is provided to the database, received by the database (S760). In response, the database provides the requested data item to the client (S762). The client receives this next data item as a "new encrypted first data item" and decrypts said data item (S764).

In case the update data item was smaller than a13, the request in step S758 indicates that the data item in the linear order before c_a13 is to be retrieved. Thus, in S764 a12 is obtained.

In case the update first data item is not located at a position relative to the partial order in between the position of the new decrypted first data item (a12) and the current decrypted first data item (a13) this means that the update first data item is located at a position in the partial order before the position of the new decrypted first data item (a12). Contrary, in case the update first data item is located at a position in the partial order between the position of the new decrypted first data item (a12) and the current decrypted first data item (a13) it is clear that the update first data item has to be stored in the relation T1 in between the data items c_a12 and c_a13.

These principles are reflected in steps S766ff: in step S766 it is determined if the update first data item is located at a position in the partial order between the position of the new decrypted first data item and the current decrypted first data item. If this is not the case, the method proceeds with S768 and S758, wherein S768 defines that the new encrypted first data item is the current encrypted first data item, i.e. that the search has to start over again for a next data item following or preceding a12, depending the new encrypted first data item being the current encrypted first data item.

Contrary, in case in step S766 the result is that the update first data item is located at a position in the partial order between the position of the new decrypted first data item and the current decrypted first data item, the method continues with step S770 in which the update first data item is encrypted using the key K. In step S772 a storage request is provided by the client to the database, the storage request comprising the encrypted update first data item and a position information, the position information instructing the server to store the encrypted update first data item in the first relation at a position in the partial order between the new decrypted first data item and the current decrypted first data item.

In step S774 the request is received and carried out by the data-base.

Additionally, information content may be associated with the update first data item. In this case, the database further comprises the second relation U (see FIG. 1), wherein the second relation comprises the second data items (or is empty on the beginning). The second data items are encrypted with a second cryptographic key, wherein a referential connection exists assigning each encrypted first data item to at least one of the second data items stored encrypted in the second relation. The further information content is comprised in the second data items.

The client may encrypt the information content associated with the update first data item with a second cryptographic key, wherein the storage request (S772) further comprises an instruction to the database to store the encrypted information content associated with the update first data item in the second relation and to provide the update first data item stored encrypted in the first relation with a referential connection (indicated in FIG. 1 by r1, r2, . . . , 3n) to the encrypted information content associated with the update first data item in the second relation.

FIG. 14 shows a flowchart illustrating a method of updating a first relation like for example the first relation T1 (36) of FIG. 1. For the following discussion it is assumed without restriction to generality that in the relation T1 to be updated the first data items form a partial ordered set in the first relation via a rooted tree, the partial order being formed with respect to the first data items in non-encrypted form.

The method starts in step S800 in which the client requests any arbitrary current first data item from the database. In this request the relation is specified. For example, relation T1 is specified (compare FIG. 1). Preferably, the current first data item may be the data item at the root of the tree.

The request is received by the database in step S802 and in response to said requesting of the current encrypted first data item, in step S804 the database provides the data item to the client. In step S806 the current encrypted first data item is received and decrypted by the client using the first cryptographic key. Now, the client will compare the current decrypted first data item with the "update first data item" to be stored in the database. Depending if the update first data item is preceding or succeeding the current decrypted first data item with respect to the partial order, either step S810 or step S812 is following:

In case the update first data item is located at a position in the partial order preceding the current decrypted first data item, in step S810 a request is provided to the database for determining the availability of a new encrypted first data item in the first relation immediately preceding the current encrypted first data item.

In case the update first data item is located at a position in the partial order succeeding the current decrypted first data item, in step S812 a request is provided to the database for determining the availability of a new encrypted first data item in the first relation immediately succeeding the current encrypted first data item.

In case in step S810 or S812 it turns out that the new encrypted first data item is available in the first relation, the method continues with step S814 by defining the current encrypted first data item being the new encrypted first data item. Then the method loops back to step S800 with requesting another current data item.

However, in case in step S810 or S812 it turns out that the new encrypted first data item is unavailable in the first relation, the method continues with step S816. This means that the current encrypted first data item forms the leaf of the tree. Consequently, the position at which the encrypted update first data item is the position "below" said leaf of the tree, i.e. at a depth of the tree which is larger by for example one level than the depth of the leaf describing the current encrypted first data item.

This is reflected in step S816ff: in case the new encrypted first data item is unavailable in the first relation, the update first data item is encrypted with the first cryptographic key (S816) for obtaining an encrypted update first data item. Then the storage request is provided to the database (S818), the storage request comprising the encrypted update first data item and a position information, the position information instructing the database to store the encrypted update first data item in the first relation at a position in the partial order immediately preceding or succeeding the position of the current encrypted first data item, depending if the update first data item is preceding or succeeding the current decrypted first data item with respect to the partial order.

LIST OF REFERENCE NUMERALS 10 client
12 processor
14 memory
16 storage medium
17 application
18 symmetric key
19 search criterion
20 second relation
22 server
24 cache
26 processor
28 memory
30 database
32 first relation
34 first relation
36 first relation
100 computer system
102 trusted environment
104 application program
106 configuration file
108 symmetric key Cryptographic key
110 key identifier
112 database system
114 network
116 database table
118 log-in component
120 assignment information
122 internet session
124 query
126 result
128 memory
130 private key
132 certificate
134 authentication information
136 processor
138 program module
140 program module
142 interface
144 interface
146 processor
148 program module
150 authentication data
152 memory
154 program module
156 program module
158 program module
160 memory
164 network interface
1012 computer system/server
1010 cloud computing node
1014 External Services
1016 processing units
1018 bus 1020 Network Adapter
1022 I/O Interfaces
1024 Display
1028 memory
1030 random access memory (RAM)
1032 cache memory
1034 storage system
1040 program
1042 program modules,
1050 cloud computing environment
1054A cellular telephone
1054B desktop computer
1054C laptop computer
1054N car

The invention claimed is:

1. A client computer for updating a first relation comprised in a database stored on a server with an update first data item, the server being coupled to the client computer via a network, wherein the first relation comprises first data items, wherein the first data items are encrypted with a first cryptographic key in the first relation, wherein the first data items form a partially ordered set in the first relation, the partial order being formed with respect to the first data items in non-encrypted form, wherein the client computer comprises a processor, and a memory storing an application program that when executed by the processor, causes the processor to perform operations including:
 i. sequentially requesting and decrypting encrypted first data items, wherein each request of the sequential requesting is performed by comparing a position of the update first data item in the partial order with a position of decrypted first data items in the partial order, wherein the sequential requesting is performed until a position in the partial order for storing the update first data item in the first relation is determined, repeating the sequential requesting until the position in the partial order is determined for storing the update first data item in the first relation such that order consistency with respect to the partial order is maintained after storing the update first data item;
 ii. when the position in the partial order for storing the update first data item in the first relation is determined, providing a storage request to the database, the storage request comprising an encrypted update first data item and the position determined in step i).

2. The client computer of claim 1, wherein step i) comprises:
 a) requesting a current encrypted first data item from the database,
 b) in response to said requesting of the current encrypted first data item, receiving from the database the current encrypted first data item,
 c) decrypting the current encrypted first data item for obtaining a current decrypted first data item,
 d) in case the update first data item is located at a position in the partial order preceding the current decrypted first data item, providing a request for determining the availability of a new encrypted first data item in the first relation immediately preceding the current encrypted first data item,
 e) in case the update first data item is located at a position in the partial order succeeding the current decrypted first data item, providing a request for determining the availability of a new encrypted first data item in the first relation immediately succeeding the current encrypted first data item,
 f) in case the new encrypted first data item is available in the first relation, requesting the new encrypted first data item and in response to said requesting receiving the new encrypted first data item, and repeating steps c)-f) with the current encrypted first data item in step c) being the new encrypted first data item,
 g) in case the new encrypted first data item is unavailable in the first relation, encrypting the update first data item with the first cryptographic key for obtaining the encrypted update first data item and providing the storage request of step ii) to the server, the storage request comprising the encrypted update first data item and a position information, the position information instructing the server to store the encrypted update first data item in the first relation at a position in the partial order immediately preceding or succeeding the position of the current encrypted first data item, depending if the update first data item is preceding or succeeding the current decrypted first data item with respect to the partial order.

3. The client computer of claim 1, wherein step i) comprises:
 a) requesting a current encrypted first data item from the database,
 b) in response to said requesting of the current encrypted first data item, receiving from the database the current encrypted first data item,
 c) decrypting the current encrypted first data item for obtaining a current decrypted first data item,
 d) providing a request for a new encrypted first data item, wherein the request for the new encrypted first data item comprises information that the new encrypted first data item is to be retrieved from a position in the partial order immediately preceding or succeeding the position of the current encrypted first data item, depending if the update first data item is preceding or succeeding the current decrypted first data item with respect to the partial order, and in response to said request for the new encrypted first data item, receiving and decrypting the new encrypted first data item,
 e) in case the update first data item is not located at a position in the partial order between the position of the new decrypted first data item and the current decrypted first data item, repeating steps c)-d) with the new encrypted first data item being the current encrypted first data item in step c), until the update first data item is located at a position in the partial order between the position of the new decrypted first data item and the current decrypted first data item,
 f) encrypting the update first data item with the first cryptographic key for obtaining an encrypted update first data item,
 wherein step ii) comprises
 g) providing the storage request to the database, the storage request comprising the encrypted update first data item and a position information, the position information instructing the database to store the encrypted update first data item in the first relation at a position in the partial order between the new decrypted first data item and the current decrypted first data item.

4. The client computer of claim 1, wherein information content is associated with the update first data item, wherein the database further comprises a second relation, wherein the second relation comprises second data items, wherein the second data items are encrypted with a second cryptographic key, wherein a referential connection exists assigning each encrypted first data item to at least one of the second data items stored encrypted in the second relation, wherein further information content is comprised in the second data items, wherein the application program is further operable for encrypting the information content associated with the update first data item with the second cryptographic key, wherein the storage request further comprises an instruction to the server to store the encrypted information content associated with the update first data item in the second relation and to provide the update first data item stored encrypted in the first relation with a referential connection to the encrypted information content associated with the update first data item in the second relation.

5. A method of updating by a client computer a first relation comprised in a database stored on a server with an update first data item, the server being coupled to the client computer via a network, wherein the first relation comprises first data items, wherein the first data items are encrypted with a first cryptographic key in the first relation, wherein the first data items form a partially ordered set in the first relation, the partial order being formed with respect to the first data items in non-encrypted form, the method comprising:

i. sequentially requesting and decrypting encrypted first data items, wherein each request of the sequential requesting is performed by comparing a position of the update first data item in the partial order with a position of decrypted first data items in the partial order, wherein the sequential requesting is performed until a position in the partial order for storing the update first data item in the first relation is determined, repeating the sequential requesting until the position in the partial order is determined for storing the update first data item in the first relation such that order consistency with respect to the partial order is maintained after storing the update first data item;

ii. when the position in the partial order for storing the update first data item in the first relation is determined, providing a storage request to the database, the storage request comprising an encrypted update first data item and the position determined in step i).

\* \* \* \* \*